United States Patent
Shiiba et al.

(10) Patent No.: US 12,478,563 B2
(45) Date of Patent: Nov. 25, 2025

(54) PATCH SHEET FOR SKIN, METHOD FOR USING SAME, ULTRAVIOLET SENSING METHOD, AND METHOD FOR EVALUATING ULTRAVIOLET PROTECTION PERFORMANCE

(71) Applicant: Kao Corporation, Tokyo (JP)

(72) Inventors: Ryota Shiiba, Utsunomiya (JP); Miyuki Sudo, Arakawa-ku (JP); Takehiko Tojo, Utsunomiya (JP); Takashi Fukui, Kawasaki (JP)

(73) Assignee: KAO CORPORATION, Tokyo (JP)

( * ) Notice: Subject to any disclaimer, the term of this patent is extended or adjusted under 35 U.S.C. 154(b) by 341 days.

(21) Appl. No.: 18/247,572

(22) PCT Filed: Sep. 29, 2021

(86) PCT No.: PCT/JP2021/036008
§ 371 (c)(1),
(2) Date: Mar. 31, 2023

(87) PCT Pub. No.: WO2022/075161
PCT Pub. Date: Apr. 14, 2022

(65) Prior Publication Data
US 2023/0270632 A1    Aug. 31, 2023

(30) Foreign Application Priority Data

Oct. 5, 2020 (JP) ................................ 2020-168785
Sep. 24, 2021 (JP) ................................ 2021-156165

(51) Int. Cl.
*G01J 1/02* (2006.01)
*A61K 8/02* (2006.01)
(Continued)

(52) U.S. Cl.
CPC ............ *A61K 8/0208* (2013.01); *A61Q 17/04* (2013.01); *G01J 1/50* (2013.01); *A61K 2800/45* (2013.01)

(58) Field of Classification Search
None
See application file for complete search history.

(56) References Cited

U.S. PATENT DOCUMENTS

| | | | |
|---|---|---|---|
| 4,705,046 | A | 11/1987 | Robillard |
| 5,986,273 | A | 11/1999 | Tripp et al. |

(Continued)

FOREIGN PATENT DOCUMENTS

| | | |
|---|---|---|
| CN | 109425428 A | 3/2019 |
| JP | 9-53981 A | 2/1997 |

(Continued)

OTHER PUBLICATIONS

Extended European search report issued on Sep. 10, 2024, in corresponding European patent Application No. 21877462.8, 9 pages.

(Continued)

*Primary Examiner* — Brian Gulledge
(74) *Attorney, Agent, or Firm* — XSENSUS LLP

(57) ABSTRACT

A skin-attaching sheet including an attaching portion configured for attaching to skin. The attaching portion includes a color-changeable layer that changes color following exposure to ultraviolet rays, and the attaching portion has a color difference (ΔE*ab) in an L*a*b* color system between before exposure and 10 seconds after exposure of 5 or more and 300 or less in a standard exposure test in which the attaching portion is exposed to ultraviolet rays in a moist state.

15 Claims, 2 Drawing Sheets

(51) Int. Cl.
    *A61Q 17/04*    (2006.01)
    *G01J 1/50*    (2006.01)

(56)        References Cited

U.S. PATENT DOCUMENTS 6,130,435   A        10/2000   Rocklin
    9,097,588   B2       8/2015    Mills et al.
    2004/0109789 A1      6/2004    Faran et al.
    2007/0113358 A1      5/2007    Rabolt et al.
    2017/0191866 A1*     7/2017    Balooch .................. G01J 1/029
    2019/0041261 A1      2/2019    Sweeting et al.
    2020/0222536 A1*     7/2020    Bellini .................. A61K 36/02

FOREIGN PATENT DOCUMENTS

JP          10-300576    A    11/1998
    JP          2009-14689   A    1/2009
    JP          2013-72151   A    4/2013
    JP          2018-127575  A    8/2018
    JP          2019-508679  A    3/2019
    JP          2019-510235  A    4/2019
    JP          2020-090097  A    6/2020
    KR          10-0744797   B1   8/2007

OTHER PUBLICATIONS

International Search Report mailed on Dec. 21, 2021 in PCT/JP2021/036008 filed on Sep. 29, 2021 (3 pages).

* cited by examiner

PATCH SHEET FOR SKIN, METHOD FOR USING SAME, ULTRAVIOLET SENSING METHOD, AND METHOD FOR EVALUATING ULTRAVIOLET PROTECTION PERFORMANCE

CROSS REFERENCE TO RELATED APPLICATIONS

This application is a National Stage entry under 35 U.S.C. § 371 of PCT/JP2021/036008, filed on Sep. 29, 2021, and claims priority to Japanese Patent Application No. 2020-168785, filed on Oct. 5, 2020 and Japanese Patent Application No. 2021-156165, filed on Sep. 24, 2021. The entire contents of each are incorporated herein by reference.

TECHNICAL FIELD

The present invention relates to a skin-attaching sheet, a method of using the same, an ultraviolet detection method, and a method for evaluating ultraviolet protection performance.

BACKGROUND ART

Technologies such as sheets containing materials that change color when exposed to ultraviolet rays are known. For example, Patent Literature 1 discloses preparing a polymer dye solution containing a color-changing dye such as a photochromic compound and a polymer, and using the prepared polymer dye solution to form fibers for use in clothes, tents, covers, and the like.

Further, the present applicant has previously proposed a nonwoven fabric composed of first fibers containing a photochromic compound and second fibers not containing the compound (Patent Literature 2).

In addition, Patent Literature 3 discloses a composite film containing a transition metal oxide and cellulose nanofibers. It is described that this composite film can be used as a photochromic film or the like that exhibits photochromism.

CITATION LIST

Patent Literature

Patent Literature 1: United States Patent Application Publication No. 2007/113358
Patent Literature 2: Japanese Patent Laid-Open No. 2013-072151
Patent Literature 3: Japanese Patent Laid-Open No. 2018-127575

SUMMARY OF INVENTION

The present invention relates to a skin-attaching sheet including an attaching portion that is used by attaching to skin.

The attaching portion preferably includes a color-changeable layer that changes color through exposure to ultraviolet rays.

The attaching portion preferably has a color difference ΔE*ab in an L*a*b* color system between before exposure and 10 seconds after exposure of 5 or more and 300 or less in a standard exposure test in which the attaching portion is exposed to ultraviolet rays under the following conditions in a moist state.

(Conditions)
Moist condition: 5 mg/cm$^2$ of water is applied on the attaching portion, and the attaching portion is left to stand for 5 minutes to moisten
Wavelength range: 280 nm to 400 nm
Exposure time: 10 seconds
Ultraviolet intensity: 1.2 mW/cm$^2$ Further, the present invention relates to a method of using the aforementioned skin-attaching sheet.

This usage method preferably includes a step of attaching the attaching portion to skin and a step of applying a liquid substance to the skin.

In addition, the present invention relates to a method of using the aforementioned skin-attaching sheet.

This usage method is preferably to attach the attaching portion to skin in a state in which the attaching portion or the skin has been moistened with a liquid substance.

Further, the present invention relates to an ultraviolet detection method using the aforementioned skin-attaching sheet.

In the ultraviolet detection method, it is preferable to attach the attaching portion to the skin, and detect an ultraviolet exposure amount by a color change of the color-changeable layer.

In addition, the present invention relates to a method for evaluating ultraviolet protection performance using a sheet that includes an evaluation portion.

The evaluation portion preferably includes a color-changeable layer that changes color through exposure to ultraviolet rays.

The evaluation portion preferably has a color difference ΔE*ab in an L*a*b* color system between before exposure and 10 seconds after exposure of 5 or more and 300 or less in a standard exposure test in which the attaching portion is exposed to ultraviolet rays under the aforementioned conditions in a moist state.

In the method for evaluating ultraviolet protection performance, it is preferable that, in a state in which an ultraviolet protection cosmetic containing an ultraviolet protection agent has been applied on the evaluation portion, an ultraviolet protection performance of the ultraviolet protection cosmetic is evaluated by a color change of the color-changeable layer.

Other features of the present invention will become apparent from the claims and the following description.

DESCRIPTION OF EMBODIMENTS

Irradiation of the skin with ultraviolet rays causes erythema, skin spots, darkening of the skin, wrinkles, and the like. To protect the skin from ultraviolet rays, it is common practice to apply to the skin an ultraviolet protection cosmetic containing an ultraviolet protection agent. If the ultraviolet protection cosmetic is not applied or applied insufficiently, or if the ultraviolet intensity is stronger than expected, the skin tends to be damaged by the ultraviolet rays. However, it is difficult to recognize the damage caused by ultraviolet rays until indications such as inflammation occur on the skin. That is, it is difficult to recognize ultraviolet exposure in real time. In addition, it has been difficult to recognize the effectiveness of the ultraviolet protection cosmetic applied on the skin, and it has been difficult to accurately grasp the timing for reapplying the ultraviolet protection cosmetic.

Patent Literature 1 to Patent Literature 3 do not disclose technologies for recognizing ultraviolet exposure to the skin. In addition, the technology described in Patent Literature 3 is insufficient in terms of enabling the ultraviolet ray exposure to be recognized with a good visibility.

Therefore, the present invention relates to a skin-attaching sheet that enables the exposure of the skin to ultraviolet rays to be recognized in real time, a method of using the same, a method for detecting ultraviolet rays using the skin-attaching sheet, and a method for evaluating ultraviolet protection performance.

Figure 1:
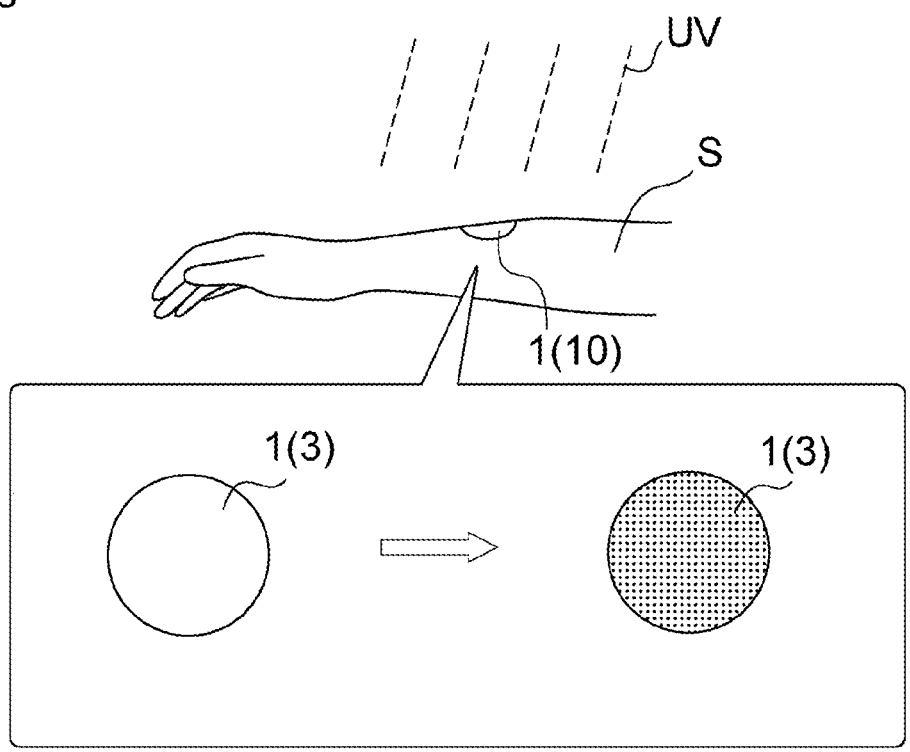
FIG. 1 is a diagram schematically showing one embodiment of a skin-attaching sheet according to the present invention, and is a plan view showing how the skin-attaching sheet attached to the skin changes color through exposure to ultraviolet rays.
Figure 2:
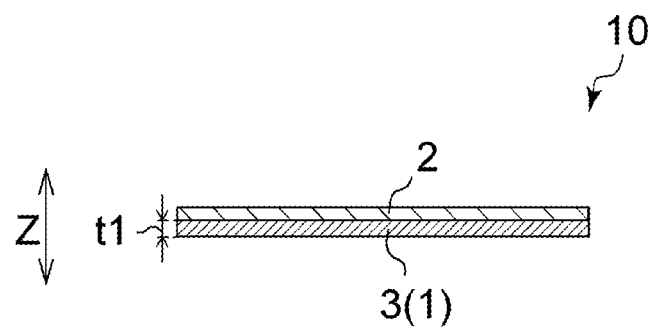
FIG. 2 is a cross-sectional view of the skin-attaching sheet shown in FIG. 1.

The present invention will now be described below based on preferred embodiments thereof with reference to the drawings. FIGS. 1 and 2 show one embodiment of the skin-attaching sheet according to the present invention.

A skin-attaching sheet 10 has an attaching portion 1 that is attached to the surface of skin S for use. An example of this embodiment is shown in FIG. 1.

The attaching portion 1 may include only a color-changeable layer 3, or may include the color-changeable layer 3 and a layer other than the color-changeable layer 3 (for example, an adhesive layer 4 described later).

In either case, it is preferable that the color-changeable layer 3 in the attaching portion 1 is configured such that the color-changeable layer 3 can receive ultraviolet rays from the outside. Examples include a form in which the non-skin-facing surface of the attaching portion 1 when in use is formed by the color-changeable layer 3.

An embodiment in which the attaching portion 1 includes the color-changeable layer 3 and has no layers other than the color-changeable layer 3 is shown in FIG. 2.

As used herein, "skin-facing surface" refers to the surface facing the skin side of a user when, in the skin-attaching sheet 10 or constituent members of the skin-attaching sheet 10 (for example, the attaching portion 1), the attaching portion 1 is attached to the skin of the user. The "non-skin-facing surface" refers to the surface facing the opposite side to the skin side of the user when, in the skin-attaching sheet 10 or constituent members of the skin-attaching sheet 10 (for example, the attaching portion 1), the attaching portion 1 is attached to the skin of the user.

The attachment target of the attaching portion 1 in the skin-attaching sheet 10 is mainly the human epidermis (skin). The part of the body to which the attaching portion 1 is to be attached is not particularly limited, and examples thereof include the face such as the forehead, nose, eyes, cheeks, and ears, the hands such as fingers, palms, and backs of the hands, the upper arms, elbows, forearms, the feet such as the toes and soles of the feet, the thighs, the back, chest, shoulders, neck, head, buttocks, and the like. From the viewpoint of enabling exposure to ultraviolet rays to be grasped more easily, the part to which the attaching portion 1 is to be attached is preferably the upper arm or the forearm.

The skin-attaching sheet 10 may have a base layer 2 arranged on one side of the attaching portion 1. When the base layer 2 is provided, the skin-attaching sheet 10 has a laminate structure in which the base layer 2 and the attaching portion 1 are laminated. To use the skin-attaching sheet 10, the base layer 2 is peeled off from the attaching portion 1 (color-changeable layer 3) for use.

By providing the base layer 2, the stiffness of the skin-attaching sheet 10 is improved, and so the attaching portion 1 can be more easily attached to the skin.

An example of the skin-attaching sheet 10 provided with the base layer 2 is shown in FIG. 2.

The base layer 2 may be a single layer or may be multiple layers of two or more layers.

A synthetic resin film or the like can be used as the base layer 2. As the synthetic resin, a polyolefin resin, a polyester resin, or the like can be used.

In the case of laminating the base layer 2 to the attaching portion 1 (color-changeable layer 3) in a peelable manner, from the viewpoint of improving the peelability, it is preferable to perform a peeling treatment, such as coating the surface of the base layer 2 opposite to the attaching portion 1 (color-changeable layer 3) with a silicone resin or subjecting the surface to a corona discharge treatment or the like.

In addition, from the viewpoint of improving peelability, when a synthetic resin film or the like is used as the base layer 2, it is preferable to coat the surface of the film with a peeling agent by providing a peeling agent layer formed by sprinkling a powder or grains of a peeling agent on the surface of the film. Examples of the peeling agent include silicone-based, fluorine-based, alkyd-based, olefin-based, and long-chain alkyl-based peeling agents.

From the viewpoint of laminating the base layer 2 on the attaching portion 1 in a peelable manner even when used in combination with a preparation (cosmetic lotion or water) to attach the attaching portion 1 to the skin, a breathable fiber sheet can be used as the base layer 2. The fiber sheet is a sheet in which fibers account for 50% or more and 100% or less of the mass of the sheet. Typical examples of the fiber sheet include various types of nonwoven fabric, woven fabric, knitted fabric, and paper, as well as laminates thereof.

Examples of nonwoven fabrics that can be used include, but are not limited to, meltblown nonwoven fabric, spunbond nonwoven fabric, air-through nonwoven fabric, spunlace nonwoven fabric, and rayon nonwoven fabric. It is preferable that the fibers or strands constituting the nonwoven fabric or a fiber sheet such as a mesh sheet have a thickness larger than that of nanofibers.

In addition, as the fibers constituting the fiber sheet, natural fibers or fibers composed of a fiber-forming synthetic resin can be used.

Examples of natural fibers include plant fibers (cotton, kapok, wood pulp, non-wood pulp, peanut protein fiber, corn protein fiber, soybean protein fiber, mannan fiber, rubber fiber, hemp, Manila hemp, sisal hemp, New Zealand flax, *Apocynum venetum*, coconut, rush, straw, and the like), animal fibers (wool, goat hair, mohair, cashmere, alpaca, angora, camel, vicuna, silk, feather, down, feather, alginate fiber, chitin fiber, casein fiber, and the like), and mineral fibers (asbestos, and the like).

Examples of synthetic fibers include semi-synthetic fibers (acetate, triacetate, acetate oxide, promix, chlorinated rubber, rubber hydrochloride, and the like), metal fibers, carbon fiber, glass fiber, and the like. Further examples that can be used include single fibers of polyolefins such as high-density polyethylene, medium-density polyethylene, low-density polyethylene, and polypropylene, polyester, polyvinylidene chloride, starch, polyvinyl alcohol, polyvinyl acetate, a copolymer thereof, a modified product thereof, and composite fibers having a core-sheath structure having a resin component of these as a sheath.

A mesh sheet can also be used for the base layer 2 from the viewpoint of laminating the base layer 2 to the attaching portion 1 in a peelable manner.

From the viewpoint of further improving the peelability, the mesh openings are preferably 20 mesh/inch or more, and more preferably 50 mesh/inch or more.

Further, from the same viewpoint, the mesh openings are preferably 200 mesh/inch or less, and more preferably 150 mesh/inch or less.

As the material for forming the mesh sheet, the same materials as those mentioned for forming the synthetic resin film described above can be used.

The attaching portion 1 preferably contains fibers. That is, it is preferable that the color-changeable layer 3 also contains fibers. When the attaching portion 1 contains fibers, the attaching portion 1 absorbs a liquid substance applied on the attaching portion 1, thereby incorporating the liquid substance. As a result, the attaching portion 1 can be less visually recognizable when the attaching portion 1 is attached to the skin in a moist state. In addition, when the attaching portion 1 contains fibers, the flexibility of the attaching portion 1 is improved, which is preferable in that when the attaching portion 1 is attached to the skin, the attaching portion 1 tends to follow the skin.

When the attaching portion 1 contains fibers, the attaching portion 1 is typically a fiber sheet.

From the viewpoint of making the attaching portion 1 less visible, the attaching portion 1 preferably contains fibers having a fiber diameter of 10 nm or more and 3 000 nm or less.

From the same viewpoint, the average fiber diameter of the fibers constituting the attaching portion 1 is preferably 10 nm or more and 3 000 nm or less, and more preferably 10 nm or more and 1 000 nm or less.

As used herein, regarding the attaching portion 1, the term "moistened state" or "moist state" refers to a state in which the attaching portion 1 has been moistened by applying a liquid substance to the attaching portion 1, that is, a state in which a liquid substance exists. The liquid substance typically contains water or an oil that is a liquid at 25° C., and examples thereof include cosmetic lotions, cosmetic emulsions, beauty essences, skin preparations for external use, and ultraviolet protection cosmetics containing such a liquid substance. As used herein, "water" means distilled water, deionized water, RO water, ultrapure water, or tap water.

A fiber having a fiber diameter of 10 nm or more and 3 000 nm or less is hereinafter referred to as "nanofiber". Further, the "fiber diameter" is the thickness of the fiber expressed as a circle-equivalent diameter.

The fiber diameter (thickness) of the nanofibers or other fibers constituting the attaching portion 1 (color-changeable layer 3) is measured by the following method. First, the fibers are observed with a scanning electron microscope (SEM) at a magnification of 1 0000 times, and one arbitrary fiber that does not have a defect (fiber clusters, intersects with a fiber, or polymer droplets) is selected from the two-dimensional image. Then, an orthogonal line perpendicular to the longitudinal direction of the selected fiber is drawn at 20 or more arbitrary points on the fiber, and the span lengths of the orthogonal lines on the fiber is measured. Then, the average of these span lengths is obtained, and the mean value thereof is taken as the fiber diameter.

The average fiber diameter of the fibers constituting the attaching portion 1 (color-changeable layer 3) is measured by the following method. First, an arbitrary fiber that does not have a defect (fiber clusters, intersects with a fiber, or polymer droplets) is selected from the two-dimensional image. Then, the orthogonal line is drawn at one arbitrary point on the selected fiber, and the span length of the orthogonal line of the fiber is measured. This span length is measured for an arbitrary 500 fibers in the two-dimensional image, the average of these measured values is obtained, and the obtained average value is taken as the average fiber diameter.

The color-changeable layer 3 preferably contains a photochromic compound. By containing a photochromic compound, the color-changeable layer 3 changes color through exposure to ultraviolet rays. It is preferable that the color-changeable layer 3 contain a photochromic compound also from the point that the degree of color change can be expressed by shades according to the amount of ultraviolet ray exposure.

A photochromic compound is a substance that can change color through irradiation with light by utilizing photochromism. Specifically, the photochromic compound is a substance capable of undergoing a color change such that a color difference $\Delta E^*ab$ of the attaching portion 1 between before and after exposure in a standard exposure test in a moist state, which is described later, is 5 or more.

Photochromism is a phenomenon in which a single chemical species reversibly changes between two states with distinguishable different absorption spectra, such change being induced in at least one direction by the action of electromagnetic radiation. In general, compounds exhibiting photochromism often change color from colorless to colored through irradiation with ultraviolet rays. Types of photochromism include thermally irreversible photochromism in which the color change occurs only through the action of light, and thermally reversible photochromism in which the change in one direction is caused by the action of light and the change in the other direction is caused by the action of heat.

In more detail, a photochromic compound is a compound in which a single chemical species undergoes ring-closing/ring-opening reactions by the action of light without a change in molecular weight, causing reversible isomerization between different absorption spectrum states, and thereby producing various colors such as yellow, red, and blue. Photochromic compounds are compounds that change color from, for example, colorless to colored through irradiation with light, in particular irradiation with ultraviolet light, and can be broadly classified into compounds that exhibit a color change only by the action of light and thermally reversible compounds that exhibit a color change by the action of heat as well as by the action of light. Photochromic compounds that exhibit a color change only by the action of light are compounds, when they are used for ultraviolet detection in everyday life, in which a color change occurs only when the compound is initially irradiated with ultraviolet light. Further, thermally reversible photochromic compounds, which exhibit a color change by the action of heat as well as by the action of light, are compounds that have a reversible nature. When thermally reversible photochromic compounds are used for ultraviolet detection in everyday life, the color change occurs not only when irradiated with ultraviolet light but also when irradiated with light from which ultraviolet light has been removed.

Examples of the aforementioned photochromic compounds that exhibit a color change only by the action of light include diarylethene compounds, fulgide compound (described in paragraph [0050] of Japanese Translation of PCT International Application Publication No. 2010-516375), bipyridine compounds, and derivatives thereof. On the other hand, examples of the aforementioned thermally reversible photochromic compounds that exhibit color change not only by the action of light but also by the action of heat include hexaarylbisimidazole (HABI) compounds, spirooxazine compounds, spiropyran compounds (described in paragraph [0048] of Japanese Translation of PCT International Application Publication No. 2010-516375, and those described on page 3 of Japanese Patent Laid-Open No. 4-202811), chromene compounds and derivatives thereof, and the like.

As the photochromic compound contained in the color-changeable layer 3, the aforementioned compounds can be used alone or in combination of two or more. For example, "Photopia Color (Purple, Yellow)" manufactured by Matsui Shikiso Chemical Co., Ltd., which is a formulations in which a plurality of the aforementioned photochromic compounds are mixed, can be used. Such formulations are mixtures (in powder form) of a spiropyran compound, a spirooxazine compound, chromene or a derivative thereof, a fulgide compound, and a bipyridine compound.

A dye that irreversibly changes color when exposed to ultraviolet rays may be used in the color-changeable layer 3 of this skin-attaching sheet. Examples of the dye include a basic dye such as malachite green and crystal violet lactone (described in paragraphs [0008] and [0009] of Japanese Patent Laid-Open No. 9-53981).

Further, it is preferable to use one or two or more of the photochromic compound and the dye in the present skin-attaching sheet depending on the use.

From the viewpoint of more reliably changing the color of the color-changeable layer 3, the content of the photochromic compound in the attaching portion 1 (color-changeable layer 3) is preferably 0.1% by mass or more, and more preferably 1% by mass or more. The content of the photochromic compound in the attaching portion 1 is the mass (% by mass) of the photochromic compound with respect to the total mass of the attaching portion 1.

From the viewpoint of maintaining the shape of the attaching portion 1 (color-changeable layer 3), the content of the photochromic compound in the attaching portion 1 is preferably 50% by mass or less, and more preferably 30% by mass or less.

From the viewpoint of both more reliably changing the color and maintaining the shape of the attaching portion 1 (color-changeable layer 3), the content of the photochromic compound in the attaching portion 1 is preferably 0.1% by mass or more and 50% by mass or less, and more preferably 1% by mass or more and 30% by mass or less.

The content of the photochromic compound in the attaching portion 1 can be adjusted based on the amount of photochromic compound used when producing the attaching portion 1. For example, when the attaching portion 1 is composed of fibers formed by electric field spinning, the content of the photochromic compound in the attaching portion 1 can be adjusted by adjusting the amount of the material used to form the attaching portion 1 and the amount of the photochromic compound used in the spinning solution described later.

[Method for Measuring Content of Photochromic Compound]

The content of the photochromic compound in the attaching portion 1 is measured by the following method.

The attaching portion 1 is removed from the skin-attaching sheet 10. If the attaching portion 1 includes layers other than the color-changeable layer 3, the attaching portion 1 is measured as it is without particularly removing only the color-changeable layer 3. First, the attaching portion 1 is cut into an arbitrary shape with commercially available scissors or cutter under conditions of 23° C. and 50% relative humidity, and a sheet piece with a mass of 20 to 40 mg is cut out from the attaching portion 1 for use as a sample. Next, the sample is subjected to combustion type gas chromatograph (GC) analysis, and the content of N element in the sample is quantified according to a calibration curve prepared based on the content of the N element with a known chemical structure, such as aspartic acid. The content of the photochromic compound is calculated from the obtained N element content. If the details of the chemical structural formula of the photochromic compound are unknown, the N element content in the compound is determined in advance by combustion type gas chromatograph analysis. For the combustion type gas chromatograph analysis, a FlashSmart (registered trademark) elemental analyzer manufactured by Thermo Fisher Scientific Inc. is used.

The position where the photochromic compound is present in the color-changeable layer 3 is not particularly limited. For example, the photochromic compound may be present on the surface of the color-changeable layer 3 or may be present inside the color-changeable layer 3. Moreover, the photochromic compound may be present in a dispersed state throughout the entire color-changeable layer 3 or may be unevenly distributed in a part of the color-changeable layer 3.

When the color-changeable layer 3 contains fibers, from the viewpoint of fixing the photochromic compound to the fibers to retain the photochromic compound on the sheet, the photochromic compound is preferably covered by the fibers. Being covered by the fibers typically refers to a state in which the photochromic compound is embedded inside the fibers. A fiber having such a form can be obtained by spinning using a raw material solution containing a resin filled with the photochromic compound.

The degree of color change of the color-changeable layer 3 is based on the L*a*b* color system (CIE 1976 (L*a*b*) color system) standardized by the International Commission on Illumination (CIE) in 1976. The degree of color change can be represented by a color difference (ΔE*ab). In the L*a*b* color system, the L* value indicates the brightness, and a* and b* values indicate the direction of the color. a* indicates a substantially red direction, −a* indicates a substantially green direction, b* indicates a substantially yellow direction, and −b* indicates a substantially blue direction.

The color difference (ΔE*ab) in the L*a*b* color system is calculated by the following formula.

$$\text{Color difference } \Delta E^*ab = \{(\Delta L^*)^2 + (\Delta a^*)^2 + (\Delta b^*)^2\}^{1/2}$$

The L* value, a* value, and b* value in the L*a*b* color system can each be measured using a handy-type spectroscopic color difference meter NF333 (trade name) manufactured by Nippon Denshoku Industries Co., Ltd., according to JIS Z 8781-4. Specifically, the sensor portion of the color difference meter is brought into direct contact with an arbitrary portion of the attaching portion 1 (color-changeable layer 3) and measured. The measurement is performed 3 times, and the mean value thereof is used as the measured value.

From the viewpoint of improving the visibility of the change in color of the color-changeable layer 3, the attaching portion 1 has a color difference in the L*a*b* color system between before exposure and 10 seconds after exposure (hereinafter, simply referred to as "ΔE*ab") of 5 or more, preferably 7 or more, and more preferably 10 or more, in the following standard exposure test in which the attaching portion 1 is exposed to ultraviolet rays in a moist state.

Although the upper limit of the color difference is not particularly limited, practically, the $\Delta E^*ab$ of the attaching portion 1 is 300 or less in the following standard exposure test in a moist state.

From the viewpoint of visibly confirming the change in color of the skin-attaching sheet due to ultraviolet exposure, in the following standard exposure test in a moist state, the attaching portion 1 has a $\Delta E^*ab$ of preferably 5 or more and 300 or less, more preferably 7 or more and 300 or less, and even more preferably 10 or more and 300 or less.

[Standard Exposure Test]

In this test, first, 5 mg/cm² of water is applied on the surface of the attaching portion 1 and left to stand for 5 minutes to bring the attaching portion 1 to a moist state. The color difference ($\Delta E^*ab$) in the $L^*a^*b^*$ color system between before exposure and 10 seconds after exposure of the moistened attaching portion 1 are both measured under the following exposure conditions.

Wavelength range: 280 nm to 400 nm;
Exposure time: 10 seconds; and
Ultraviolet intensity: 1.2 mW/cm².

The test is performed in the moist state to make the attaching portion 1 less visible in a state where the attaching portion 1 is attached to the skin. In a dry state, the attaching portion 1 cannot transmit light, and hence cannot be measured.

The wavelength of the ultraviolet rays in the standard exposure test can be set by using a bandpass filter, a spectroscope, or the like. An ultraviolet light source such as a mercury lamp, a solar simulator (simulated sunlight source), or the like can be used as the ultraviolet light source. For ultraviolet rays in any wavelength range, the attaching portion 1 has a color difference ($\Delta E^*ab$) between before ultraviolet exposure and 10 seconds after ultraviolet exposure of 1 or more.

Further, in the standard exposure test, the ultraviolet rays are uniformly irradiated on the attaching portion 1. For example, it is possible to uniformly irradiate the attaching portion 1 by introducing a plate that diffuses light between the attaching portion 1 and the ultraviolet light source, or by providing an integrating sphere, an optical fiber bundle, a light guide, or the like.

A skin-attaching sheet 10 having the base layer 2 is used by peeling off the base layer 2 from the attaching portion 1 and attaching the attaching portion 1 including the color-changeable layer 3 to the skin. Since the color-changeable layer 3 contains the photochromic compound described above, the color-changeable layer 3 changes color when exposed to ultraviolet rays. That is, when the attaching portion 1 under sunlight is exposed to ultraviolet A (UVA), ultraviolet B (UVB), or ultraviolet C (UVC) contained in the sunlight, the color-changeable layer 3 changes color. This makes it possible to visually confirm whether or not the skin has been exposed to ultraviolet rays, and allows the user of the skin-attaching sheet 10 to recognize the exposure of the skin to ultraviolet rays in real time. In addition, a user who has recognized ultraviolet exposure can more easily take measures against ultraviolet rays, such as applying an ultraviolet protection cosmetic containing an ultraviolet protection agent on their skin, and can suppress damage to the skin caused by ultraviolet rays. Ultraviolet protection cosmetics are so-called sunscreen cosmetics.

Further, since the color difference ($\Delta E^*ab$) between before exposure and 10 seconds after exposure the attaching portion 1 in the [Standard exposure test] described above is equal to or more than the aforementioned lower limit, even when the color of the skin to which the attaching portion 1 is attached is dark (for example, dark black), the visibility of the change in color of the attaching portion 1 is excellent. This makes it possible to easily recognize the exposure of the skin to ultraviolet rays under sunlight.

In addition, the skin-attaching sheet 10 can be used in an ultraviolet detection method for detecting ultraviolet rays. In such a method, when the attaching portion 1 attached to the skin is exposed to sunlight, the color-changeable layer 3 in the attaching portion 1 changes color due to the ultraviolet rays included in the sunlight. As a result of the color change, the ultraviolet exposure of the skin can be detected.

The ultraviolet detection method is not limited to a mode in which the attaching portion 1 of the skin-attaching sheet 10 is exposed to sunlight. For example, the attaching portion 1 may be used by exposing to ultraviolet rays using an ultraviolet irradiation device.

From the viewpoint of making the attaching portion 1 less visible before exposure to ultraviolet rays, the average thickness t1 (see FIG. 2) of the attaching portion 1 is preferably 0.1 μm or more, more preferably 5 μm or more, and even more preferably 10 μm or more.

In addition, from the viewpoint of effectively hiding spots and creases on the skin due to the attaching portion 1, the average thickness t1 of the attaching portion 1 is preferably 500 μm or less, more preferably 200 μm or less, and even more preferably 100 μm or less.

Further, the average thickness t1 of the attaching portion 1 is preferably 0.1 μm or more and 500 μm or less, more preferably 5 μm or more and 200 μm or less, and even more preferably 10 μm or more and 100 μm or less.

The average thickness t1 of the attaching portion 1 is measured by the following method. First, the attaching portion 1 is removed from the skin-attaching sheet 10, and using a contact-type film thickness gauge (Litematic VL-50A (R5 mm ultra-hard spherical stylus), manufactured by Mitutoyo Corporation), the thickness of any three points of the attaching portion 1 is measured. The average of these measurements is then calculated and used as the average thickness of the attaching portion 1. The pressure of the stylus applied on the object to be measured during measurement is 0.01 Pa.

The thickness of the attaching portion 1 may be constant in the planar direction, or may vary. In the latter case, the attaching portion 1 may, for example, gradually increase in thickness inwardly from the peripheral edge.

Figure 3:
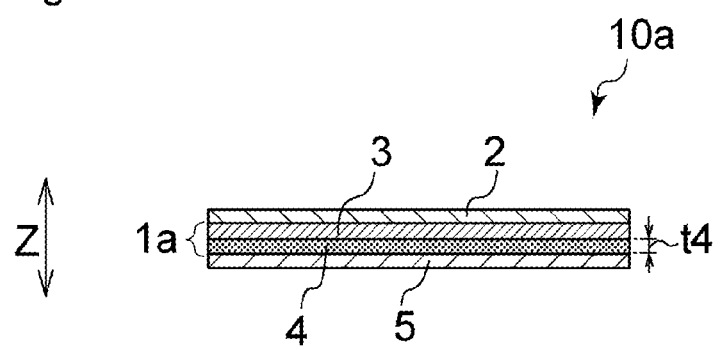
FIG. 3 is a view equivalent to FIG. 2 showing another embodiment of the skin-attaching sheet according to the present invention.

Although the attaching portion 1 (color-changeable layer 3) is very thin, for convenience of explanation, the attaching portion 1 (color-changeable layer 3) shown in FIGS. 2 and 3 is drawn very large.

From the viewpoint of making the attaching portion 1 before exposure to ultraviolet rays less visible, the attaching portion 1 has a visible light transmittance of preferably 1% or more, and more preferably 10% or more, in a state before exposure to ultraviolet rays and in which water has been applied to moisten the attaching portion 1.

The attaching portion 1 practically has a visible light transmittance of 80% or less in a state before exposure to ultraviolet rays and in which water has been applied to moisten the attaching portion 1.

From the viewpoint of making the attaching portion 1 less visible before exposure to ultraviolet rays, the attaching portion 1 preferably has a visible light transmittance of 1% or more and 80% or less, and more preferably 10% or more and 80% or less, in a state before exposure to ultraviolet rays and in which water has been applied to moisten the attaching portion 1.

The visible light transmittance in a state in which water has been applied to moisten is measured by the following method. First, the attaching portion 1 including the color-changeable layer 3 is removed from the skin-attaching sheet 10, water is added so that the applied amount is 5 mg/cm$^2$, and the attaching portion 1 left to stand for 5 minutes. As a result, the attaching portion 1 is "in the state of water has been applied to moisten the attaching portion 1" of this measurement. This attaching portion 1 is used as a measurement sample. Next, the measurement sample is attached to a quartz glass plate (plate thickness 1 mm), and the quartz glass plate to which the measurement sample is attached is mounted on a sheet measurement cell so that the planar direction of the attaching portion 1 is perpendicular to the beam incident angle of a spectrophotometer. The transmittance (T %) at a wavelength of 600 nm is measured using a spectrophotometer (model U-2000A, manufactured by Hitachi, Ltd.) to measure the visible light transmittance.

The attaching portion 1 contains a polymer compound capable of forming fibers, and is preferably formed by depositing nanofibers containing a polymer compound. More specifically, the attaching portion 1 preferably contains nanofibers composed of a water-insoluble polymer. Thus, when the attaching portion 1 contains a water-insoluble polymer as a forming material, this is preferable in terms of the point that the shape of the attaching portion 1 can be suitably maintained even when the attaching portion 1 comes into contact with a liquid substance such as a cosmetic lotion.

"Water-insoluble" refers to a substance having a nature such that, under an environment of 1 atm and 23° C., when 1 g of the attaching portion 1 is weighed and then immersed in 10 g of deionized water, after 24 hours, no more than 0.5 g of the immersed color-changeable layer 3 dissolves, and preferably no more than 0.8 g dissolves.

The content of the water-insoluble polymer in the attaching portion 1 can be measured by utilizing the water-insoluble nature of the water-insoluble polymer. Measurement examples are shown below.

[Method for Measuring Content of Water-Insoluble Polymer in Attaching Portion 1]

Under an environment of 1 atm and 23° C., 1 g of the attaching portion 1 is weighed and then immersed in 10 g of deionized water. After 24 hours of immersion, the deionized water (aqueous solution containing the water-insoluble polymer) in which the attaching portion 1 has been immersed is filtered under reduced pressure using filter paper (No. 5c, 12 cm, manufactured by Advantech). The water-insoluble polymer remaining on the filter paper is dried together with the filter paper under reduced pressure (80° C./1 Pa/24 hours). The mass of the water-insoluble polymer is measured by subtracting the mass of the filter paper from the mass of the sample obtained by drying under reduced pressure.

As the water-insoluble polymer, a thermoplastic resin, a thermosetting resin, a cellulose resin, or indigestible protein can be used.

Examples of the thermoplastic resin include a polyolefin resin, a polyester resin, a polyamide resin, a vinyl resin, an acrylic resin, a polyimide resin, an aromatic polyether ketone resin, a polyamideimide resin, a polycarbonate resin, a polyurethane resin, a modified cellulose chemically modified with a cellulose molecule, shellac, and the like.

Examples of the polyolefin resin include polypropylene (PP), polyethylene, an ethylene-α-olefin copolymer, an ethylene-propylene copolymer, and the like.

Examples of the polyester resin include polyethylene terephthalate, polytetramethylene tephthalate, polybutylene tephthalate, polyethylene naphthalate, polybutylene naphthalate, polyhydroxybutyric acid, polyhydroxyalkanoate, polycaprolactone, polybutylene succinate, a polylactic acid resin such as polylactic acid (PLA) and a lactic acid-hydroxycarboxylic acid copolymer, polybutylene naphthalate, a liquid crystal polymer, and the like.

Examples of the polyamide resin include nylon 6, nylon 66, aramid, and the like.

Examples of the vinyl resin include polyvinyl chloride resin, polyvinylidene chloride resin, vinyl acetate resin, vinylidene chloride resin, polyvinyl alcohol (PVA), polyvinyl acetal, polyvinyl butyral (PVB), and the like.

Examples of the acrylic resin include polyacrylic acid, polymethacrylic acid resin, polyacrylic acid ester, polymethacrylic acid, polymethacrylic acid ester, and the like.

Examples of the polyimide resin include polyimide resin, polyamideimide resin, polyetherimide resin, and the like.

Examples of the aromatic polyether ketone resin include polyether ketone, polyether ether ketone, and polyether ether ketone ketone, and the like.

Examples of thermosetting resin include a phenolic resin, a urea resin, a melamine resin, an epoxy resin, and an oxazoline-modified silicone such as a poly(N-propanoylethyleneimine)graft-dimethylsiloxane/γ-aminopropylmethylsiloxane copolymer, and the like.

Examples of the indigestible protein include zein (main component of corn protein) and the like.

Examples of the cellulose resin include ethyl cellulose, water-insoluble cellulose derivatives, and the like.

These water-insoluble polymers can be used alone or in combination of two or more.

From the viewpoint of maintaining the shape of the fibers, it is preferable to use, from among these water-insoluble polymers, one or two or more selected from polyvinyl butyral resin, fully saponified or partially saponified PVA, an oxazoline-modified silicone, polyester resin, zein, and ethyl cellulose.

The attaching portion 1 may include a water-soluble polymer. Examples of the water-soluble polymer include a mucopolysaccharide such as pullulan, hyaluronic acid, chondroitin sulfate, poly-γ-glutamic acid, modified corn starch, β-glucan, a gluco-oligosaccharide, heparin, and keratosulfate; a natural polymer such as cellulose, pectin, xylan, lignin, glucomannan, galacturonic acid, thyrium seed gum, tamarind seed gum, gum arabic, tragacanth gum, a soy water-soluble polysaccharide, alginic acid, carrageenan, laminaran, agar (agarose), fucoidan, methylcellulose, hydroxypropyl cellulose, and hydroxypropyl methylcellulose; a synthetic polymer such as a partially saponified polyvinyl alcohol (not used in combination with a cross-linking agent), a low saponified polyvinyl alcohol, polyvinyl pyrrolidone, polyethylene oxide, water-soluble nylon, water-soluble polyester, and sodium polyacrylate, and the like. These water-soluble polymers can be used alone or in combination of two or more.

From the viewpoint of maintaining the shape of the fibers forming the attaching portion 1 in an even better manner, the content of the water-insoluble polymer in the attaching portion 1 is, relative to the total mass of the attaching portion 1, preferably more than 50% by mass, and more preferably 80% by mass or more. When the water-insoluble polymer is contained in such a range, it is more difficult for the fibers forming the attaching portion 1 to dissolve in water, and the fiber form of the fibers is more easily maintained. As a result, the retention of the liquid substance such as water in the attaching portion 1 is improved, the attaching portion 1 can be prevented from attaching too strongly to the skin, and the photochromic compound can be prevented from coming off.

From the viewpoint of improving the visibility of the color change of the color-changeable layer 3 in the attaching portion 1, the content of the water-insoluble polymer in the attaching portion 1 is, relative to the total mass of the attaching portion 1, preferably 99% by mass or less, and more preferably 90% by mass or less.

From the viewpoint of the maintaining the shape of the attaching portion 1, the water-insoluble polymer content in the attaching portion 1 is preferably in the same range as the content of the water-insoluble polymer in the color-changeable layer 3 described above.

The attaching portion 1 (color-changeable layer 3) may contain only the fibers such as nanofibers and the photochromic compound, or may contain other components in addition to the fibers such as nanofibers and the photochromic compound. As such other components, components that are used in cosmetics and that are not substances capable of forming fibers and are not a photochromic compound can be used. Examples include medicinal components, moisturizing components, various vitamins, fragrances, surfactants, stabilizers, preservatives, and antioxidants. These components can be used alone or in combination of two or more.

From the viewpoint of improving the attachability to the skin, the planar view shape of the attaching portion 1 is preferably a shape including a plurality of curved sections with different curvatures in its outline, a shape including a plurality of straight sections in its outline, or a shape including such curved sections and straight sections in its outline. Examples of a shape including a plurality of curved sections with different curvatures in its outline include a shape whose planar view shape includes curved sections having a plurality of types of curvature, such as an ellipse, and a shape in which a plurality of curved sections with different curvatures form an uneven shape, and the like. Examples of a shape including a plurality of straight sections in its outline include shapes whose planar view shape is a polygonal shape, such as a rectangle, a triangle, a quadrilateral, and a hexagon, an arrow shape, a star shape, and the like. Further, examples of shapes that include a curved section and a straight section in its outline include a fan shape, a teardrop shape, a semicircle shape, a heart shape, and the like. The attaching portion 1 having such a shape easily follows and attached to a complex shape such as a face.

Another embodiment of the skin-attaching sheet according to the present invention is shown in FIG. 3. The embodiment shown in FIG. 3 will be described mainly regarding the constituent parts different from those of the embodiment shown in FIGS. 1 and 2, similar constituent parts will be denoted by the same reference numerals, and duplicate description thereof will be omitted. The description of the embodiment shown in FIGS. 1 and 2 is appropriately applicable to the constituent parts that are not particularly described here.

The attaching portion may have another layer other than the color-changeable layer 3. That is, the attaching portion may be a laminated structure including a plurality of layers. For example, on the skin-facing surface side of the color-changeable layer 3, it is preferable to have an adhesive layer 4 containing an adhesive as "another layer". The adhesive layer 4 is preferably laminated on the color-changeable layer 3. An example of this is shown in FIG. 3.

From the viewpoint of preventing the photochromic compound contained in the color-changeable layer 3 from coming into contact with the skin, and in particular from the viewpoint of improving the attachability to the skin when the "another layer" is the adhesive layer 4, it is preferable that an attaching portion 1a of a skin-attaching sheet 10a has another layer laminated on the skin-facing surface side of the color-changeable layer 3, and that this another layer does not contain a photochromic compound (see FIG. 3).

From the viewpoint of making the attaching portion 1a attached to the skin less visible and improving the absorbability of the liquid substance, such as a cosmetic lotion, the another layer preferably contains fibers. Typically, it is more preferable that the another layer is composed of a fiber sheet, and even more preferably is composed of nanofibers.

Examples of the "another layer" include the adhesive layer 4. The adhesive layer 4 is the part that comes into contact with the skin in the attaching portion 1a when in use.

As will be described later, when the attaching portion 1a including fibers is in a moist state, the attaching portion 1a becomes more transparent, making it less visible. From the viewpoint of more easily making the attaching portion 1a be in a moist state by absorbing a liquid substance such as a cosmetic lotion applied on the skin, the adhesive layer 4 preferably contains fibers, and more preferably contains nanofibers.

From the viewpoint of making the attaching portion 1a attached to the skin less visible, if the attaching portion 1a has layers other than the color-changeable layer 3, it is preferable that each of the layers forming the attaching portion 1 contains fibers. Typically, it is more preferable that each of the layers is composed of a fiber sheet, and more preferably is composed of nanofibers.

From the same viewpoint, the average fiber diameter of the fibers constituting each layer forming the attaching portion 1 is preferably 10 nm or more and 3 000 nm or less, and more preferably 10 nm or more and 1 000 nm or less.

From the viewpoint of more reliable attachability, an average thickness t4 (see FIG. 3) of the adhesive layer 4 is preferably 0.1 µm or more, and more preferably 0.5 µm or more.

From the viewpoint of making the attaching portion 1a attached to the skin less visible, the average thickness t4 of the adhesive layer 4 is preferably 10 µm or less, and more preferably 5 µm or less.

From the viewpoint of achieving both the attachability and lower-visibility of the attaching portion 1a, the average thickness t4 of the adhesive layer 4 is preferably 0.1 µm or more and 10 µm or less, and more preferably 0.5 µm or more and 5 µm or less.

From the viewpoint of more reliable attachability, the average basis weight of the adhesive layer 4 is preferably 0.005 mg/cm$^2$ or more, and more preferably 0.1 mg/cm$^2$ or more.

From the viewpoint of making the attaching portion 1a attached to the skin less visible, the average basis weight of the adhesive layer 4 is preferably 5 mg/cm$^2$ or less, and more preferably 0.5 mg/cm$^2$ or less.

From the viewpoint of achieving both the attachability and lower-visibility of the attaching portion 1a, the average basis weight of the adhesive layer 4 is preferably 0.005 mg/cm$^2$ or more and 5 mg/cm$^2$ or less, and more preferably 0.1 mg/cm$^2$ or more and 0.5 mg/cm$^2$ or less.

The skin-attaching sheet 10a preferably includes a second base layer 5 laminated on the skin-facing surface side of the adhesive layer 4. Such a configuration is preferable in that unintended adhesion by the adhesive layer 4 can be suppressed, the operation of attaching the attaching portion 1*a* becomes easier, and damage to the adhesive layer 4 is prevented.

As the second base layer 5, a release paper that can be peeled off from the adhesive layer 4 or a sheet such as a synthetic resin film can be used without any particular limitation.

As the adhesive forming the adhesive layer 4, a resin that has adhesiveness by itself, or a resin that exhibits adhesiveness when used in combination with a curing agent, can be used without particular limitation.

Examples of the resin used in the adhesive include an acrylic resin, a urethane resin, water-soluble vinyl acetate, polyvinyl alcohol, cyanoacrylate, and ethylene vinyl acetate. These resins may be used alone or in combination of two or more.

Examples of the acrylic resin include a water-insoluble acrylic resin such as an acrylic water-insoluble anionic resin, and a water-insoluble acrylic nonionic resin.

From the viewpoint of more reliably ensuring adhesiveness in a moist state, the adhesive is preferably a water-insoluble adhesive.

Among such adhesives, from the viewpoint of achieving both adhesiveness and re-peelability, the adhesive is preferably an acrylic resin, a urethane resin, or a mixture thereof.

Next, the method of using the skin-attaching sheet of the present invention will be described by taking a method of using the skin-attaching sheet 10 having the base layer 2 as an example.

This usage method includes an attachment step of attaching the attaching portion 1 including the color-changeable layer 3 to the skin, and an application step of applying a liquid substance on the skin. The attachment step and the application step can be performed in any order. That is, the usage method may be a method (1) in which the application step is performed after performing the attachment step, or a method (2) in which the attachment step is performed after performing the application step.

In method (1), the attachment step is performed first. Specifically, the skin-attaching sheet 10 is pressed against the skin S so that the skin S and the attaching portion 1 are in contact with each other. At this time, the skin-attaching sheet 10 is pressed from the base layer 2 side toward the skin. After the attaching portion 1 is adhered to the skin, the base layer 2 is peeled off from the attaching portion 1 and removed. As a result of this, only the attaching portion 1 is attached to the surface of the skin S. Next, the application step is performed. Specifically, the liquid substance is applied on the skin through the attaching portion 1. The liquid substance is absorbed by the attaching portion 1, and the attaching portion 1 becomes moist. In this method (1), the liquid substance is applied on the attaching portion 1 and the skin S around the site to which the attaching portion 1 is attached. Thus, this method (1) includes an attachment step of attaching the attaching portion 1 to the skin S and an application step of applying the liquid substance on the skin together with the attaching portion 1.

In method (2), the application step is performed first. Specifically, the liquid substance is applied on the skin S. In this method (2), the liquid substance is applied on the skin S to which the attaching portion 1 is to be attached. The liquid substance may be applied not only on the portion to which the attaching portion 1 is to be attached, but also on the skin S around that portion. Next, the attachment step is performed. Specifically, the skin-attaching sheet 10 is pressed against the skin S so that the skin S on which the liquid substance has been applied and the attaching portion 1 are in contact with each other. At this time, the skin-attaching sheet 10 is pressed from the base layer 2 side toward the skin. After the attaching portion 1 has been adhered to the skin, the base layer 2 is peeled off from the attaching portion 1 and removed. As a result of this, only the attaching portion 1 is attached to the surface of the skin S. The attaching portion 1 that has been attached absorbs the liquid substance applied on the skin S and becomes moist. Thus, this method (2) includes an application step of applying the liquid substance on the skin S and an attachment step of attaching the attaching portion 1 to the skin S on which the liquid substance has been applied.

In methods (1) and (2), the attachment step or application step may be performed after the attaching portion 1 has been moistened. For example, in method (1), the attaching portion 1 may be moistened with the liquid substance, and then the attachment step of attaching the moistened attaching portion 1 to the skin may be performed, then the application step of applying the liquid substance on the skin S may be performed. Further, in method (2), the application step of applying the liquid substance on the skin S may be performed. Then, the attaching portion 1 may be moistened with the liquid substance, and the attachment step of attaching the moistened attaching portion 1 to the skin may be performed.

When the attaching portion 1 includes only the color-changeable layer 3, it is preferable to attach the attaching portion 1 by method (2) from the viewpoint of further improving the close adhesion of the attaching portion 1 and the ease of the attachment operation.

When the attaching portion 1 includes the color-changeable layer 3 and the adhesive layer 4, it is preferable to attach the attaching portion 1 by method (1) from the viewpoint of easier attachment. In this case, after peeling the second base layer 5 from the adhesive layer 4, the attaching portion 1*a* is attached by pressing the skin-attaching sheet 10*a* against the skin S so that the skin S and the adhesive layer 4 are in contact with each other. Then, the base layer 2 on the non-skin-facing surface side of the attaching portion 1*a* is peeled off, and the liquid substance is applied on the attaching portion 1*a*.

Either method (1) or (2) may be used in the aforementioned ultraviolet detection method and in the method for evaluating ultraviolet protection performance described later.

In the method for evaluating ultraviolet protection performance, in a case where the attaching portion 1 or 1*a* has been attached by method (1), the liquid substance to be applied on the attaching portion 1 is an ultraviolet protection cosmetic.

Further, in a case where the attaching portion 1 has been attached by method (2), an ultraviolet protection cosmetic is applied on the surface of the attaching portion 1 or 1*a* after the attachment step. In this case, from the viewpoint of more reliably obtaining an ultraviolet protection performance of the cosmetic, the liquid substance applied on the skin S in the application step is preferably an ultraviolet protection cosmetic.

In methods (1) and (2), in the case where the attachment step or the application step is performed after the attaching portion 1 has been moistened, the liquid substance used to moisten the attaching portion 1 is preferably an ultraviolet protection cosmetic.

Another method of using the skin-attaching sheet is to attach the attaching portion 1 or 1*a* to the skin S in a state in which the attaching portion 1 or 1*a* including the color-changeable layer 3 or the skin S has been moistened with the liquid substance. This is preferable because the moistened attaching portion 1 or 1*a* has better transparency, and hence is less visible, and closely adheres well to the skin. In such a usage method, for example, the attaching portion 1 or 1*a* is moistened with the liquid substance, and then the moistened attaching portion 1 or 1*a* is attached to the skin S. The attaching portion 1 or 1*a* is moistened by applying the liquid substance.

The usage methods described in this mode may be used in the aforementioned method for detecting ultraviolet rays and the method for evaluating ultraviolet protection performance described later.

When performing the above methods (1) and (2), or when moistening the attaching portion, in the method of using the skin-attaching sheet, the application of the liquid substance on the attaching portion 1 or the skin S may be performed by placing the liquid substance on the surface of the attaching portion 1 or the surface of the skin S and then applied by spreading by using the fingers, or may be performed by spraying the liquid substance toward the surface of the attaching portion 1 or the surface of the skin S.

From the viewpoint of ensuring the aforementioned effects, it is preferable that the liquid substance is applied on the attaching portion 1 or 1*a* or the skin S in an amount of 1 mg/m$^2$ or more, and more preferably 5 mg/m$^2$ or more.

From the viewpoint of retaining the liquid substance in the sheet, it is preferable that the liquid substance is applied on the attaching portion 1 or 1*a* or the skin S in an amount of 20 mg/m$^2$ or less, and more preferably 10 mg/m$^2$ or less.

From the viewpoint of the transparency of the attaching portion, the close adhesion of the attaching portion to the skin, and the retention of the liquid substance, it is preferable that the liquid substance is applied on the attaching portion 1 or 1*a* or the skin S in an amount of 1 mg/m$^2$ or more and 20 mg/m$^2$ or less, and more preferably 5 mg/m$^2$ or more and 10 mg/m$^2$ or less.

The liquid substance to be applied on the attaching portion 1 or 1*a* or the skin S means a substance that is a liquid at 25° C. The liquid substance is a liquid such as water, an aqueous solution, or an aqueous dispersion, and include a polyol that is a liquid at 25° C., a gel-like substance thickened with a thickening agent, an oil that is a liquid at 25° C., an oil agent that contains 10% by mass or more of such an oil, an emulsions (O/W emulsion, W/O emulsion) containing such an oil and a surfactant such as a nonionic surfactant, and the like.

From the viewpoint of applying on the skin S, the liquid substance is preferably one or a plurality selected from a cosmetic lotion, a cosmetic emulsion, a beauty essence, and an ultraviolet protection cosmetic.

In the case where the liquid substance contains a polyol that is a liquid at 25° C., examples of the polyol include one or two or more selected from ethylene glycol, propylene glycol, 1,3-butanediol, dipropylene glycol, polyethylene glycol having a weight average molecular weight of 2 000 or less, glycerin, and diglycerin.

In the case where the liquid substance contains an oil that is a liquid at 25° C., examples of the oil include a hydrocarbon oil, an ester composed of a linear or branched fatty acid and a linear or branched alcohol or a polyhydric alcohol, an ester oil, a silicone oil, and the like.

Examples of the hydrocarbon oil include liquid paraffin, squalane, squalene, n-octane, n-heptane, cyclohexane, light isoparaffin, and liquid isoparaffin, and the like.

Examples of the ester composed of a linear or branched fatty acid and a linear or branched alcohol or polyhydric alcohol include octyldodecyl myristate, myristyl myristate, isocetyl stearate, isocetyl isostearate, cetearyl isononanoate, adipine diisobutyl acid, di-2-ethylhexyl sebacate, isopropyl myristate, isopropyl palmitate, diisostearyl malate, neopentyl glycol dicaprate, alkyl benzoate (12 to 15 carbon atoms), and the like.

Examples of the ester oil include a triglycerol fatty acid ester (triglyceride) and the like.

Examples of the triglycerin fatty acid ester include tri (caprylic acid/capric acid) glycerin and the like.

Examples of the silicone oil include dimethylpolysiloxane, dimethylcyclopolysiloxane, methylphenylpolysiloxane, methylhydrogenpolysiloxane, and higher alcohol-modified organopolysiloxane, and the like.

These may be used alone or in combination of two or more.

In the case where the liquid substance contains an oil that is a solid at 25° C., examples of the oil include one or more selected from vaseline, cetanol, stearyl alcohol, ceramide, and the like.

Next, the method for producing the skin-attaching sheet of the present invention will be described by taking the method for producing the skin-attaching sheet shown in FIG. 2 as an example. The production method includes an attaching portion formation step.

In the attaching portion formation step, the attaching portion 1 is formed on the base layer 2 by discharging the raw material(s) of the layer(s) forming the attaching portion 1, such as the color-changeable layer 3. This step can use a known electric field spinning device such as the electric field spinning device disclosed in Japanese Patent Laid-Open No. 2020-90097 (paragraphs [0066] to [0081]). That is, in the attaching portion formation step, the attaching portion 1 is formed by depositing fibers (nanofibers) produced from a raw material solution containing the raw material(s) of the layer(s) forming the attaching portion 1, such as the color-changeable layer 3, on the base layer 2 by an electric field spinning method. This raw material solution is hereinafter also referred to as "spinning solution".

In the attaching portion formation step, the average thickness of the attaching portion 1, the average thickness of the color-changeable layer 3, and the shape of the attaching portion 1 may be adjusted by controlling the movement of the discharge nozzle that discharges the raw material solution, the discharge amount of the raw material solution, the distance between the discharge nozzle and the continuous sheet of the base layer, and the like.

In the case of forming the color-changeable layer 3 in the attaching portion formation step, a solution obtained by dissolving or dispersing a polymer compound such as a water-insoluble polymer capable of forming fibers and a photochromic compound in a solvent can be used as the raw material solution. As the polymer compound capable of forming fibers, the compounds described above can be used without particular limitation.

In addition to the water-insoluble polymer described above, the raw material solution can also contain an inorganic particle, an organic particle, a plant extract, a surfactant, an oil agent, an electrolyte for adjusting the ion concentration, and the like as appropriate.

Examples of the solvent of the raw material solution include water, methanol, ethanol, 1-propanol, 2-propanol, hexafluoroisopropanol, 1-butanol, isobutyl alcohol, 2-butanol, 2-methyl-2-propanol, tetraethylene glycol, triethylene glycol, dibenzyl alcohol, 1,3-dioxolane, 1,4-dioxane, methyl ethyl ketone, methyl isobutyl ketone, methyl-n-hexyl ketone, methyl-n-propyl ketone, diisopropyl ketone, diisobutyl ketone, acetone, hexafluoroacetone, phenol, formic acid, methyl formate, ethyl formate, propyl formate, methyl benzoate, ethyl benzoate, propyl benzoate, methyl acetate, ethyl acetate, propyl acetate, dimethyl phthalate, diethyl phthalate, dipropyl phthalate, methyl chloride, ethyl chloride, methylene chloride, chloroform, o-chlorotoluene, p-chlorotoluene, carbon tetrachloride, 1,1-dichloroethane, 1,2-dichloroethane, trichloroethane, dichloropropane, dibromoethane, dibromopropane, methyl bromide, ethyl bromide, propyl bromide, acetic acid, benzene, toluene, hexane, cyclohexane, cyclohexanone, cyclopentane, o-xylene, p-xylene, m-xylene, acetonitrile, tetrahydrofuran, N,N-dimethylformamide, pyridine, and the like. These solvents can be used alone or in combination of two or more.

Examples of the combination of the solvent and the water-insoluble polymer in the raw material solution include a combination of PVB and ethanol, a combination of PLA and chloroform, and a combination of oxazoline-modified silicone and ethanol.

Examples of the combination of the solvent and the photochromic compound in the raw material solution include a combination of ethanol and a spiropyran compound, a combination of a spirooxazine compound and 2-propanol, a combination of a chromene compound and acetone, and the like.

From the viewpoint of improving the dispersibility of the photochromic compound in the raw material solution, it is preferable to subject the raw material solution to a mechanical dispersion treatment. Examples of a disperser used in the mechanical dispersion treatment include a disintegrator, a beater, a low-pressure homogenizer, a high-pressure homogenizer, a grinder, a cutter mill, a ball mill, a jet mill, a short-screw extruder, a twin-screw extruder, an ultrasonic stirrer, a magnetic stirrer, a domestic juicer mixer, and the like. Examples of the high-pressure homogenizer include Microfluidizer (manufactured by Microfluidics), NanoVeda (manufactured by Yoshida Kikai Kogyo Co., Ltd.), Ultimizer (manufactured by Sugino Machine Ltd.), and the like. When the mechanical dispersion treatment is performed using a high-pressure homogenizer, the photochromic compound in the raw material solution can be controlled to have a desired dispersed state and particle size by controlling the treatment pressure and the number of passes.

From the viewpoint of the dispersibility of the raw material solution, the treatment pressure in the mechanical dispersion treatment is preferably 100 MPa or higher, and more preferably 150 MPa or higher.

From the viewpoint of production properties of the raw material solution, the treatment pressure is preferably 250 MPa or less, and more preferably 200 MPa or less.

From the viewpoint of both the dispersibility and the production properties of the raw material solution, the treatment pressure is preferably 100 MPa or more and 250 MPa or less, and more preferably 150 MPa or more and 200 MPa or less.

From the viewpoint of the dispersibility of the raw material solution, the number of passes in the mechanical dispersion treatment is preferably 1 or more, and more preferably 5 or more.

From the viewpoint of the production properties of the raw material solution, the number of passes is preferably 30 or less, and more preferably 20 or less.

From the viewpoint of both the dispersibility and the production properties of the raw material solution, the number of passes is preferably 1 or more and 30 or less, and more preferably 5 or more and 20 or less.

As the raw material solution, a solution containing a water-soluble polymer that becomes water-insoluble after fiber formation by an electric field spinning method can be used. Such a solution contains fully saponified PVA as the water-insoluble polymer and also contains a photochromic compound. Fully saponified PVA is water-soluble, but can be changed into water-insoluble by heating.

That is, a color-changeable layer 3 or attaching portion 1 that includes nanofibers containing a water-insoluble polymer composed of fully saponified PVA can be obtained by depositing water-insoluble fibers by the above-mentioned electric field spinning method to form a color-changeable layer 3 or attaching portion 1 and then heating.

This heating temperature is from 60 to 300° C., and the heating time is 1 minute or more and 200 minutes or less.

Forming the color-changeable layer 3 by an electric field spinning method using a raw material solution containing a photochromic compound is preferable in that fibers in which the photochromic compound is embedded inside the fiber can be formed.

Further, a fiber layer in which the fibers have been deposited by an electric field spinning method may be formed using a raw material solution that does not contain the photochromic compound, and then a liquid containing the photochromic compound may be applied on the surface of the fiber layer to form a color-changeable layer 3 in which the photochromic compound is present on the surface.

In addition, when the attaching portion 1a has an adhesive layer 4 that contains fibers, the adhesive layer 4 can also be formed by an electric field spinning method. For example, an adhesive layer forming solution containing an adhesive and a solvent may be discharged onto one surface of the second base layer 5 by an electric field spinning method to form an adhesive layer 4 composed of fibers on the second base layer 5. The skin-attaching sheet 10a can be obtained by bonding the thus-obtained adhesive laminated body in which the second base layer 5 and the adhesive layer 4 are laminated on a laminated sheet in which the color-changeable layer 3 and the base layer 2 are laminated.

The solvent used for the adhesive layer forming solution can be the same as the solvent used for the raw material solution described above.

Examples of the combination of the solvent and the adhesive in the adhesive layer forming solution include a combination of ethyl acetate and a water-insoluble acrylic anionic resin, a combination of ethanol and a water-insoluble acrylic nonionic resin, and the like.

When the adhesive layer 4 is formed by an electric field spinning method, the spinning conditions can be the same as for the attaching portion 1.

Next, the method for evaluating ultraviolet protection performance according to the present invention will be described. In this evaluation method, a sheet provided with an evaluation portion including the color-changeable layer 3 described above is used. The evaluation portion can have the same configuration as the attaching portion 1 described above, but its form is not particularly limited as long as it has the color-changeable layer 3. That is, in the method for evaluating ultraviolet protection performance according to the present invention, the evaluation portion does not necessarily have to be attached to an object such as the skin.

In the method for evaluating ultraviolet protection performance according to the present invention, when the evaluation portion is exposed to sunlight in a state where the ultraviolet protection cosmetic has been applied on the evaluation portion, a difference arises in the degree of color change of the color-changeable layer 3 on the evaluation portion depending on the ultraviolet protection performance of the ultraviolet protection cosmetic. When the degree of such color change is large, it can be evaluated that the ultraviolet protection performance is low, and when the degree of color change is small, it can be evaluated that the ultraviolet protection performance is high. The degree of color change is the darkness or paleness after the change in color. The darker the color is, the larger the degree of color change is. And the paler the color is, the smaller the degree of color change is. Thus, the effectiveness of the ultraviolet protection cosmetic can be recognized by the color change of the evaluation portion (color-changeable layer 3) in a state where the ultraviolet protection cosmetic has been applied. As a result, the ultraviolet protection cosmetic can be used on the skin, and when the evaluation portion applied with the cosmetic has been attached to the skin, the timing for reapplying the ultraviolet protection cosmetic can be accurately grasped.

When the attaching portion 1 is used as the evaluation portion, in the aforementioned method for evaluating ultraviolet protection performance, the ultraviolet protection cosmetic is applied on the attaching portion 1, which is the evaluation portion. When the attaching portion 1 contains fibers, the ultraviolet protection cosmetic is absorbed into the attaching portion 1, and is in a state of containing the cosmetic. Alternatively, the attaching portion 1 containing fibers may be attached to the portion on which the ultraviolet protection cosmetic has been applied, and the attaching portion 1 may absorb and contain the cosmetic. In either mode, the evaluation portion in the method for evaluating ultraviolet protection performance is not particularly limited in terms of its attachment target or placement location. That is, the evaluation portion may be used in a state attached to the skin S, or may be used in a state attached to something other than the skin S, such as a hat, clothing, or a parasol, or may be used in a state in which it is not attached to anything and is instead used in a mounted state.

Further, in the method for evaluating ultraviolet protection performance, the evaluation portion is not limited to a mode in which it is exposed to sunlight. For example, an ultraviolet irradiation device may be used to expose the evaluation portion to ultraviolet rays.

Although the present invention has been described above with respect to preferred embodiments, the present invention is not limited to the embodiments described above, and may be modified as appropriate. Moreover, the aforementioned embodiments may be combined.

For example, in the skin-attaching sheet 10 described above, the color-changeable layer 3 is directly laminated on the base layer 2, but the skin-attaching sheet 10 may be provided with another layer between the base layer 2 and the color-changeable layer 3.

In addition, although in the mode described above the adhesive layer 4 contains fibers, the adhesive layer 4 may be a layer in which the adhesive is a film-like layer.

In the skin-attaching sheet 10 of the embodiments described above, the attaching portion 1 or the color-changeable layer 3 contains fibers, but the attaching portion 1 or the color-changeable layer 3 does not have to contain fibers. For example, the attaching portion 1 or the color-changeable layer 3 may be composed of a film made of the thermoplastic resin described above. For example, the attaching portion 1 may have a form in which a color-changeable layer 3 made of a film containing the photochromic compound and another film layer not containing the photochromic compound are laminated.

In the embodiments described above, the skin-attaching sheet 10 of the present invention is used in a state attached to the skin S, but the skin-attaching sheet 10 may be used in a state attached to something else other than skin S, such as a hat, clothing, or a parasol.

When an upper limit numerical value, a lower limit numerical value, or upper and lower limit numerical values are specified in this specification, the values themselves of the upper and lower limit numerical values are also included. Further, even when there is no explicit indication, it may be interpreted that all numerical values or numerical ranges below the upper limit numerical value, above the lower limit numerical value, or within the range of the upper and lower limit numerical values are described.

As used herein, "a", "an", and the like are to be construed as meaning one or more.

It shall be understood that various modifications and variations can be made to the present invention in light of the above disclosure herein. Therefore, it should be understood that the present invention can be implemented in embodiments not explicitly described in this specification within the technical scope based on the statements in the scope of claims.

All of the subject matter of the patent literature described above are hereby incorporated into this specification as part of this specification.

EXAMPLES

The present invention will now be described in more detail with reference to the following examples. However, the scope of the present invention is not limited to these examples. Unless otherwise specified, "%" means "% by mass".

Example 1

A skin-attaching sheet including an attaching portion 1 composed of a color-changeable layer 3 was produced. First, a photochromic compound (Photopia Color Purple, manufactured by Matsui Shikiso Chemical Co., Ltd.) was added to a mixed solution containing PVB (S-LEC BH-3, manufactured by Sekisui Chemical Co., Ltd.) and ethanol, and the resulting mixture was stirred to prepare a spinning solution (raw material solution) in which the photochromic compound was dispersed. The content of each component in the spinning solution is shown in Table 1 below. The spinning solution was discharged onto the base layer by an electric field spinning method to produce a laminated sheet in which an attaching portion (color-changeable layer) composed of fibers (nanofibers) was laminated on the base layer. A rayon nonwoven fabric was used for the base layer. The spinning conditions were as follows. Moreover, the spinning time was set to 240 minutes.

Spinning environment: 25° C., 40% RH
Applied voltage to nozzle: 30 kV
Distance between nozzle and base layer: 220 mm
Discharge rate of raw material solution: 2 mL/hour
Nozzle inner diameter: 0.35 mm (23G)

Based on the above operation, a laminated sheet was produced in which the attaching portion (color-changeable layer) and the base layer were laminated, and the laminated sheet was cut by a cutting device equipped with an anvil and a Thomson blade to produce a skin-attaching sheet. The obtained skin-attaching sheet had a photochromic compound embedded inside the fibers.

The details of each example and each comparative example are shown in Table 1 or 2.

Examples 2 to 6, 8, 9, 14 and 15

In Examples 2 to 6, skin-attaching sheets were produced in the same manner as in Example 1, except that the blended amount of each component in the spinning solution (raw material solution) and the spinning time were varied as shown in Table 1 below.

In addition, in Examples 8 and 9, skin-attaching sheets were produced in the same manner as in Examples 4 and 5, except that a photochromic compound (Photopia Color Yellow, manufactured by Matsui Shikiso Chemical Co., Ltd.) was used (see Table 1 below).

In Example 14, a skin-attaching sheet was produced in the same manner as in Example 1, except that a photochromic compound (Sunny Color VIOLET, manufactured by Kiroku Sozai Kenkyujo Co., Ltd.) was used (see Table 2 below).

In Example 15, a skin-attaching sheet was produced in the same manner as in Example 1, except that a photochromic compound (Sunny Color PINK, manufactured by Kiroku Sozai Kenkyujo Co., Ltd.) was used (see Table 2 below).

Example 7

In Example 7, a skin-attaching sheet having an attaching portion 1a including a color-changeable layer 3 and an adhesive layer 4 was produced. First, a laminate sheet was produced in the same manner as in Example 5, except that a release film (polymethylpentene; TPX film manufactured by Mitsui Chemicals, Inc.) was used as the base layer. A release paper (Asagi KS80 PW 8E, manufactured by Lintec Corporation) was prepared as a second base layer, and an adhesive layer was formed on the second base layer. Specifically, an adhesive layer forming solution was prepared and spun onto the surface of the second base layer to form an adhesive layer composed of fibers (average fiber diameter 1 000 nm). The adhesive layer forming solution was prepared by mixing 8% by mass of an adhesive (water-insoluble acrylic resin: HiPas10, manufactured by CosMED Pharmaceutical Co., Ltd.) as a solute and 92% by mass of an ethyl acetate solution as a solvent. The spinning conditions for forming the adhesive layer were the same as those for the color-changeable layer. The basis weight of the adhesive layer was 0.1 mg/cm$^2$. Next, the adhesive laminate body, in which the second base layer and the adhesive layer were laminated, was laminated to the color-changeable layer of the laminate sheet to obtain an adhesive laminate sheet. The adhesive laminate sheet was then subjected to a half-cut on the second base layer side using a Thomson blade to produce a skin-attaching sheet having an adhesive layer.

Examples 10 and 11

In Examples 10 and 11, skin-attaching sheets were produced in the same manner as Example 1, except that the composition of the spinning solution (raw material solution) was changed as shown in Table 2 below, and the spinning time was changed as shown in Table 2 below.

In Example 10, a polyurethane resin (BAYCUSAN C 2000, Covestro Japan Co., Ltd.) was used as the water-insoluble polymer.

In Example 11, polyacrylonitrile resin (DERMACRYL 79, AkzoNobel N.V.) was used as the water-insoluble polymer. This resin is simply referred to as "acrylic" in Table 2. The spinning solution (raw material solution) was prepared by mixing the water-soluble polymer, ethanol, and 1-butanol.

Example 12

In Example 12, PP (MF650Y, manufactured by PolyMirae Company ltd., melting point 160° C.) was used as the water-insoluble polymer. First, the PP and an additive (acyl alkyl taurine salt (sodium N-stearoyl-N-methyltaurate; Nikko Chemicals Co., Ltd.) manufactured by Nikkol SMT) were added into the main feeder of a twin-screw extruder (Twin-screw kneading extruder TEX25αIII, manufactured by The Japan Steel Works, Ltd.) and allowed to melt, then a photochromic compound (Photopia Color Purple, manufactured by Matsui Shikiso Chemical Co., Ltd.) was added to the side feeder of the twin-screw extruder and mixed to prepare a spinning solution in which the photochromic compound was dispersed in the PP. The content of each component in the spinning solution (melt resin composition) is shown in Table 2. The spinning solution (melt resin composition) was discharged onto the base layer by an electric field spinning method to produce a laminated sheet in which an attaching portion (color-changeable layer) composed of fibers (nanofibers) was laminated on the base layer.

In Example 12, for the electric field spinning method, an electric field spinning device having a nozzle, a charging electrode, and a gas flow ejection part for ejecting a gas flow from the rear end to the front end of the nozzle was used. In this electric field spinning device, the charging electrode had a substantially bowl-like shape surrounding the nozzle, and the nozzle and the charging electrode were spaced apart from each other. The nozzle was charged by the charging electrode to generate an electric field between the nozzle and the charging electrode. In this state, the spinning solution was discharged from the nozzle onto the base layer to produce a laminated sheet in which an attaching portion (color-changeable layer) composed of fibers (nanofibers) was laminated on the base layer. When discharging the spinning solution, the base layer was conveyed in one direction. Further, when discharging the spinning solution, the spinning solution discharged from the nozzle was drawn by a gas flow (air flow) ejected from the gas flow ejection part to form fibers (nanofibers). A spunbond nonwoven fabric (PP resin, basis weight 18 g/m$^2$) was used for the base layer. The spinning conditions were as follows. Moreover, the conveyance speed of the base layer was adjusted so that the thickness of the color-changeable layer was 10 μm. The obtained skin-attaching sheet had a photochromic compound embedded inside the fibers.

Spinning environment: 27° C., 50% RH
Heating temperature of spinning solution: 200° C.
Nozzle inner diameter: 0.25 mm
Applied voltage to nozzle (made of stainless steel): 0 kV (grounded)
Distance between nozzle and base layer: 550 mm
Conveyance speed of base layer: 1.5 m/min
Spinning solution discharge rate: 1 g/min
Temperature of gas flow ejected from gas flow ejection part: 350° C.
Flow rate of gas flow ejected from gas flow ejection part: 320 L/min
Air speed of gas flow ejected from gas flow ejection part: 50 m/min
Applied voltage to charging electrode: −20 kV The obtained laminated sheet was cut by the cutting device used in Example 1 to produce a skin-attaching sheet.

Example 13

In Example 13, an attaching portion was produced by forming a color-changeable layer containing a photochromic compound on a film having an adhesive layer. First, a polyurethane film (Nitoms Inc., tape ST-279 for fixing wearable devices/biological sensors, thickness 30 μm) was prepared. 40 parts by mass of a photochromic compound (Photopia Color Purple, manufactured by Matsui Shikiso Chemical Co., Ltd.) was added to 60 parts by mass of UV-curable ink (T&K TOKA Co., Ltd., Best Cure UV161) (hereinafter referred to as "UV-curable ink"), and the mixture was stirred to prepare a UV-curable ink/photochromic compound dispersion solution in which the photochromic compound was dispersed. Then, using a bar coater (A-Bar OSP-10, film thickness 10 μm/wet, Mitsui Electric Co., Ltd.), the UV-curable ink/photochromic compound dispersion solution was applied on one surface of the polyurethane film so that the film thickness after curing by ultraviolet irradiation was to be 10 μm. Next, the dispersion solution was irradiated with ultraviolet rays using a UV irradiator (HLDL-2230UV365-FN4U, manufactured by CCS Co., Ltd.) to cure the UV-curable ink in the dispersion solution. As a result, a film layer (color-changeable layer) containing the photochromic compound was formed on one side of the polyurethane film to obtain a laminated sheet. The obtained laminated sheet was cut by the cutting device used in Example 1 to produce a skin-attaching sheet composed of a film-like attaching portion.

Comparative Examples 1 and 2

In Comparative Example 1, a skin-attaching sheet was produced in the same manner as in Example 4, except that a spinning solution that did not contain a photochromic compound was used to form a color-changeable layer, and the spinning time was 120 minutes.

In Comparative Example 2, a skin-attaching sheet was produced in the same manner as in Comparative Example 1, except that the spinning time was 240 minutes.

Comparative Example 3

In Comparative Example 3, a skin-attaching sheet including a film-like attaching portion 1 having the same components as the attaching portion 1 of Example 1 but not containing fibers was produced. Specifically, the spinning solution used in Example 1 was applied on a release paper with a bar coater (A-Bar OSP-52, thickness 52 μm/wet, manufactured by Mitsui Electric Co., Ltd.). Then, the release paper applied with the spinning solution was left at room temperature of 25° C. and humidity of 40% for 24 hours to volatilize the solvent, thereby producing a film-shaped attaching portion that did not contain fibers.

The average thickness of the attaching portion (color-changeable layer), the average fiber diameter of the fibers constituting the attaching portion (color-changeable layer), and the visible light transmittance of the attaching portion (color-changeable layer) in a state before exposure to ultraviolet rays and in which water had been applied to moisten the attaching portion of the skin-attaching sheet of each example and each comparative example are shown below in Tables 1 and 2. These measured values were obtained by the methods described above. Further, the below Tables 1 and 2 show the content of the water-insoluble polymer and the content of the photochromic compound in the attaching portion of each example and each comparative example.

The content of the water-insoluble polymer in the attaching portion was determined by the same method as described above in [Method for measuring content of water-insoluble polymer in attaching portion 1]. Since the attaching portion in each example and each comparative example was formed of PVB, the amount dissolved in the deionized water in which the attaching portion 1 was immersed was close to zero. Even if the attaching portion 1 contained PVB and water-soluble impurities, the amount of PVB dissolved in deionized water is usually in the order of a few ppm. The content of the photochromic compound in the attaching portion was determined by subtracting the content of the water-insoluble polymer from the mass of the attaching portion.

[Evaluation of Color Change by Standard Exposure Test of Exposing to Ultraviolet Rays]

The color change of the skin-attaching sheet of each example and each comparative example due to ultraviolet exposure was evaluated by the following method. A cosmetic emulsion (est Biomimesis Veil Effector, manufactured by Kao Corporation) was uniformly applied over a range of 50 mm in diameter on a skin model (cheek skin model (female in 30 s), color #10, manufactured by Beaulax Co., Ltd.) so that the amount of application was 5 mg/cm$^2$. A skin-attaching sheet (circular shape with a diameter of 10 mm) was pressed against the portion on which the cosmetic emulsion had been applied so that the attaching portion 1 was in contact with the skin, and the attaching portion 1 was attached to the skin model. Next, the base layer was peeled off, left to stand for 5 minutes, and then the L* value, a* value, and b* value in the L*a*b* color system of the attaching portion 1 attached to the skin model were measured. The measurement results are shown in the below Tables 1 and 2.

Next, the attaching portion 1 attached to the skin model was exposed to ultraviolet rays under the following conditions. The ultraviolet rays were filtered through a No. 5 filter (manufactured by Asahi Spectra Co., Ltd.) to adjust the exposure wavelength to 280 nm to 400 nm. The irradiation distance is the separation distance between the light source of the ultraviolet irradiation device and the color-changeable layer.

Ultraviolet irradiation device: UV lamp MAX-302 (manufactured by Asahi Spectra Co., Ltd., output 80%)
Ultraviolet illuminance: 1.2 mW/cm$^2$
Exposure time: 10 seconds After 10 seconds of ultraviolet exposure under these conditions, the a* and b* values in the L*a*b* color system of the color-changeable layer attached to the skin model were measured. Further, the color difference (ΔE*ab) between before and after ultraviolet exposure was determined. The measurement results are shown in the below Tables 1 and 2.

[Evaluation of Color Change Under Sunlight]

The color change under sunlight of the skin-attaching sheet of each example and each comparative example was evaluated by the following method. Using 10 researchers of skin care agents as subjects, a cosmetic emulsion (est Biomimesis Veil Effector, manufactured by Kao Corporation) was applied on the forearms of the subjects so that the amount of application was 2.5 mg/cm$^2$ to obtain a moist state. Next, a skin-attaching sheet (circular shape with a diameter of 30 mm) was pressed against the moistened portion of the forearm so that the attaching portion 1 was in contact with the skin, and the attaching portion 1 was attached to the skin. Next, the base layer was peeled off, and a small amount of the above cosmetic emulsion was applied on the attaching portion 1 attached to the skin (application amount: 2.5 mg/cm$^2$).

Next, the subjects (skin care agent researchers) moved outside, visually observed the attaching portion (color-changeable layer), and evaluated the change in color of the color-changeable layer under sunlight (sunny, total sunshine amount 1.477 MJ/m$^2$) using the following evaluation points. The evaluations were performed 5 minutes after exposing the attaching portion (color-changeable layer) to sunlight. The evaluation results are shown in the below Tables 1 and 2. The mean value of the evaluation scores of the 10 subjects was used as the evaluation result.

- 2 points: Color change in the color-changeable layer is clearly noticeable.
- 1 point: Color change of the color-changeable layer is slightly noticeable.
- 0 points: There is no change in the color of the color-changeable layer.

[Close Adhesion to Skin]

The change in appearance during actual use of the skin-attaching sheet of each example and each comparative example was evaluated by the following method. Using 10 researchers of skin care agents as subjects, a cosmetic emulsion (est Biomimesis Veil Effector, manufactured by Kao Corporation) was applied on the forearms of the subjects so that the amount of application was 2.5 mg/cm$^2$ to obtain a moist state. Next, a skin-attaching sheet (circular shape with a diameter of 30 mm) was pressed against the moistened portion of the forearm so that the attaching portion 1 was in contact with the skin, and the attaching portion 1 was attached and properly adhered to the skin. Next, the base layer was peeled off, and a small amount of the cosmetic emulsion (coating amount: 2.5 mg/cm$^2$) was applied on the surface of the attaching portion 1 and rubbed in. Then, the attaching portion 1 was left at room temperature (25° C.) for 5 minutes, and each of the aforementioned subjects evaluated the close adhesion of the attaching portion 1 to the skin based on the following 5-grade evaluation. The mean value of the evaluation scores of the 10 subjects was used as the evaluation result.

- 5 points: Close adhesion is very high.
- 4 points: Close adhesion is high.
- 3 points: Close adhesion exists.
- 2 points: Close adhesion is low.
- 1 point: Close adhesion is very low.

[Durability of Attachment to Skin]

After the [Close adhesion to skin] test, an attaching portion 1 was attached to the forearm and left at room temperature (25° C.) for an additional 30 minutes. Then, each of the subjects sensorily evaluated the durability of the attachment state of the attaching portion 1 based on the following 5-grade evaluation. The mean value of the evaluation scores of the 10 subjects was used as the evaluation result.

- 5 points: Very difficult to peel off
- 4 points: Difficult to peel off
- 3 points: Attached state is maintained.
- 2 points: Easy to peel off
- 1 point: Very easy to peel off

TABLE 1

|  |  | Example 1 | Example 2 | Example 3 | Example 4 | Example 5 |
|---|---|---|---|---|---|---|
| Spinning solution | water-insoluble polymer (% by mass) | 14.98 | 14.98 | 14.88 | 14.75 | 14.75 |
|  | photochromic compound (% by mass) | 0.15 | 0.15 | 0.79 | 1.64 | 1.64 |
|  | additive (% by mass) | — | — | — | — | — |
|  | ethanol (% by mass) | 84.87 | 84.87 | 84.33 | 83.61 | 83.61 |
|  | 1-butanol (% by mass) | — | — | — | — | — |
| Spinning time (minutes) |  | 240 | 90 | 120 | 45 | 90 |
| Water-insoluble polymer | type | PVB | PVB | PVB | PVB | PVB |
|  | content in attached portion (% by mass) | 99 | 99 | 95 | 90 | 90 |
| Photochromic compound | color after ultraviolet exposure | purple | purple | purple | purple | purple |
|  | content in attached portion (% by mass) | 1 | 1 | 5 | 10 | 10 |
| Average thickness (μm) |  | 10 | 2.5 | 10 | 5 | 10 |
| Average fiber diameter (nm) |  | 823 | 765 | 790 | 819 | 849 |
| Minimum fiber diameter (nm) |  | 450 | 459 | 420 | 471 | 376 |
| Maximum fiber diameter (nm) |  | 1190 | 1189 | 1080 | 1150 | 1077 |
| Visible light transmittance (%) |  | 1.2 | 42.3 | 1.5 | 23.5 | 1.3 |
| Adhesive layer |  | no | no | no | no | no |
| Standard exposure test | ultraviolet exposure | before / after | before / after | before / after | before / after | before / after |
|  | L* value | 70.0 / 49.8 | 68.8 / 61.1 | 69.8 / 60.4 | 67.6 / 61.1 | 68.2 |
|  | a* value | 5.9 / 6.1 | 7.7 / 6.5 | 6.6 / 5.5 | 7.8 / 7.2 | 8.6 |
|  | b* value | 12.2 / −11.1 | 20.0 / 11.0 | 17.5 / 7.2 | 20.1 / 13.7 | 17.6 |
|  | color difference (ΔE*ab) | 30.8 | 11.9 | 14.0 | 9.2 | 14.9 |

TABLE 1-continued

|  |  |  |  |  |  |  |
|---|---|---|---|---|---|---|
| Evaluation of color change under sunlight (scores) |  | 2 | 1 | 2 | 1 | 2 |
| Adhesion to skin | mean value of evaluation scores | 2.2 | 4.6 | 4.6 | 4.5 | 4.7 |
| Durability of attachment to skin | mean value of evaluation scores | 3.4 | 3.1 | 3.5 | 3.6 | 4.3 |

|  |  |  | Example 6 | Example 7 | Example 8 | Example 9 |
|---|---|---|---|---|---|---|
| Spinning solution | water-insoluble polymer (% by mass) |  | 14.09 | 14.75 | 14.75 | 14.75 |
|  | photochromic compound (% by mass) |  | 6.04 | 1.64 | 1.64 | 1.64 |
|  | additive (% by mass) |  | — | — | — | — |
|  | ethanol (% by mass) |  | 79.87 | 83.61 | 83.61 | 83.61 |
|  | 1-butanol (% by mass) |  | — | — | — | — |
| Spinning time (minutes) |  |  | 90 | 90 | 45 | 90 |
| Water-insoluble polymer | type |  | PVB | PVB | PVB | PVB |
|  | content in attached portion (% by mass) |  | 70 | 90 | 90 | 90 |
| Photochromic compound | color after ultraviolet exposure |  | purple | purple | yellow | yellow |
|  | content in attached portion (% by mass) |  | 30 | 10 | 10 | 10 |
| Average thickness (μm) |  |  | 10 | 10 | 5 | 10 |
| Average fiber diameter (nm) |  |  | 778 | 882 | 817 | 863 |
| Minimum fiber diameter (nm) |  |  | 401 | 523 | 459 | 503 |
| Maximum fiber diameter (nm) |  |  | 1039 | 1203 | 1176 | 1100 |
| Visible light transmittance (%) |  |  | 1.2 | 1.4 | 21.1 | 2.1 |
| Adhesive layer |  |  | no | yes | no | no |
| Standard exposure test | ultraviolet exposure |  | before after | before after | before after | before after |
|  | L* value |  | 69.8   60.4 | 67.9   57.7 | 68.0   65.8 | 68.8   63.8 |
|  | a* value |  | 6.6   5.5 | 8.0   5.4 | 8.2   9.7 | 7.4   12.3 |
|  | b* value |  | 17.5   7.2 | 18.1   7.1 | 21.7   35.7 | 21.4   43.5 |
|  | color difference (ΔE*ab) |  | 14.0 | 15.2 | 14.3 | 23.2 |
| Evaluation of color change under sunlight (scores) |  |  | 2 | 2 | 1 | 2 |
| Adhesion to skin | mean value of evaluation scores |  | 4.7 | 4.9 | 4.5 | 4.7 |
| Durability of attachment to skin | mean value of evaluation scores |  | 3.5 | 4.6 | 4.2 | 3.5 |

TABLE 2

|  |  | Example 10 | Example 11 | Example 12 | Example 13 | Example 14 |
|---|---|---|---|---|---|---|
| Spinning solution | water-insoluble polymer (% by mass) | 38.29 | 19.57 | 86.36 | — | 14.75 |
|  | photochromic compound (% by mass) | 4.26 | 2.17 | 9.09 | — | 1.64 |
|  | additive (% by mass) | — | — | 4.55 | — | — |
|  | ethanol (% by mass) | 57.45 | 44.02 | — | — | 83.61 |
|  | 1-butanol (% by mass) | — | 34.24 | — | — | — |

TABLE 2-continued

|  |  |  |  |  |  |  |
|---|---|---|---|---|---|---|
| Spinning time (minutes) |  | 15 | 30 | — | — | 90 |
| Water-insoluble polymer | type | polyurethane | acrylic | PP | *polyurethane | PVB |
|  | content in attached portion (% by mass) | 90 | 90 | 90 | 90 | 90 |
| Photochromic compound | color after ultraviolet exposure | purple | purple | purple | purple | violet |
|  | content in attached portion (% by mass) | 10 | 10 | 10 | 10 | 10 |
| Average thickness (μm) |  | 20 | 10 | 10 | 40 | 10 |
| Average fiber diameter (nm) |  | 1730 | 560 | 410 | no fibers | 1070 |
| Minimum fiber diameter (nm) |  | 930 | 190 | 100 | no fibers | 470 |
| Maximum fiber diameter (nm) |  | 4470 | 1070 | 4920 | no fibers | 2080 |
| Visible light transmittance (%) |  | 10.6 | 4.2 | 3.2 | 13.1 | 1.7 |
| Adhesive layer |  | no | no | no | yes | no |
| Standard exposure test | ultraviolet exposure | before / after | before / after | before / after | before / after | before |
|  | L* value | 71.2 / 64.0 | 70.9 / 65.4 | 67.6 / 59.0 | 67.9 / 51.3 | 70.7 |
|  | a* value | 7.2 / 9.1 | 6.6 / 6.8 | 6.1 / 6.7 | 5.7 / 10.2 | 7.3 |
|  | b* value | 19.7 / 11.7 | 16.9 / 9.4 | 16.7 / 5.6 | 19.3 / 0.9 | 18.9 |
|  | color difference (ΔE*ab) | 8.4 | 6.8 | 10.3 | 18.5 | 11.0 |
| Evaluation of color change under sunlight (scores) |  | 2 | 1 | 1 | 1 | 2 |
| Adhesion to skin | mean value of evaluation scores | 4.7 | 3.3 | 4.5 | 4.8 | 4.6 |
| Durability of attachment to skin | mean value of evaluation scores | 4.4 | 2.7 | 4.3 | 4.7 | 4.1 |

|  |  | Example 15 | Comparative Example 1 | Comparative Example 2 | Comparative Example 3 |
|---|---|---|---|---|---|
| Spinning solution | water-insoluble polymer (% by mass) | 14.75 | 14.75 | 14.75 | 14.98 |
|  | photochromic compound (% by mass) | 1.64 | — | — | 0.15 |
|  | additive (% by mass) | — | — | — | — |
|  | ethanol (% by mass) | 83.61 | 83.61 | 83.61 | 84.87 |
|  | 1-butanol (% by mass) | — | — | — | — |
| Spinning time (minutes) |  | 90 | 120 | 240 | — |
| Water-insoluble polymer | type | PVB | PVB | PVB | PVB |
|  | content in attached portion (% by mass) | 90 | 100 | 100 | 99 |
| Photochromic compound | color after ultraviolet exposure | pink | — | — | purple |
|  | content in attached portion (% by mass) | 10 | — | — | 1 |
| Average thickness (μm) |  | 10 | 5 | 10 | 10 |
| Average fiber diameter (nm) |  | 1100 | 753 | 695 | no fibers |
| Minimum fiber diameter (nm) |  | 630 | 450 | 392 | no fibers |
| Maximum fiber diameter (nm) |  | 2320 | 1237 | 1154 | no fibers |
| Visible light transmittance (%) |  | 1.8 | 25.3 | 2.1 | 45.1 |
| Adhesive layer |  | no | no | no | no |
| Standard exposure test | ultraviolet exposure | before / after | before / after | before / after | before / after |
|  | L* value | 71.8 / 67.2 | 70.4 / 70.0 | 70.5 / 70.7 | 68.0 / 64.0 |
|  | a* value | 6.9 / 9.7 | 7.1 / 6.9 | 6.8 / 6.5 | 7.7 / 7.9 |
|  | b* value | 15.8 / 9.1 | 16.1 / 17.7 | 15.3 / 16.4 | 14.8 / 17.4 |
|  | color difference (ΔE*ab) | 5.3 | 1.7 | 1.1 | 4.7 |

TABLE 2-continued

| | | | | | |
|---|---|---|---|---|---|
| Evaluation of color change under sunlight (scores) | | 2 | 0 | 0 | 1 |
| Adhesion to skin | mean value of evaluation scores | 4.7 | 4.0 | 3.1 | 2.2 |
| Durability of attachment to skin | mean value of evaluation scores | 4.3 | 3.2 | 2.8 | 1.4 |

*film

[Evaluation of Performance of Ultraviolet Protection Cosmetic]

The performance of the ultraviolet protection cosmetic of the skin-attaching sheet of Example 5 was evaluated by the following method. Using 10 researchers of skin care agents as subjects, a cosmetic emulsion (est Biomimesis Veil Effector, manufactured by Kao Corporation) was applied on the forearms of the subjects so that the amount of application was 5 mg/cm² to obtain a moist state. Next, a skin-attaching sheet (circular shape with a diameter of 30 mm) was pressed against the moistened portion of the forearm so that the color-changeable layer was in contact with the skin, and the color-changeable layer was attached to the skin. Next, the base layer was peeled off, and a small amount of each liquid substance a to c was applied on the color-changeable layer (application amount: 5 mg/cm²). The liquid substance a and the liquid substance b were commercially available ultraviolet protection cosmetics of SPF 50+ and PA 4+, respectively. The liquid substance c was a commercially available cosmetic lotion.

Next, the subjects (skin care agent researchers) moved outside, visually observed the attaching portion (color-changeable layer), and evaluated the change in color of the attaching portion (color-changeable layer) under sunlight (sunny, total sunshine amount 1.477 MJ/m²) using the following evaluation points. The evaluations were performed 1, 5, and 10 minutes after exposing the attaching portion to sunlight. The evaluation results are shown in the below Table 3. The mean value of the evaluation scores of the 10 subjects was used as the evaluation result.

2 points: Color change in the color-changeable layer can be clearly noticeable.
1 point: Color change of the color-changeable layer is slightly noticeable.
0 points: No change in the color of the color-changeable layer.

TABLE 3

| | Example 5 Elapsed time under sunlight | | |
|---|---|---|---|
| | 1 minute | 5 minutes | 10 minutes |
| Liquid substance a | 0 | 0 | 0 |
| Liquid substance b | 0 | 0 | 1 |
| Liquid substance c | 2 | 2 | 2 |

As shown in Tables 1 and 2, unlike Comparative Examples 1 and 2, the skin-attaching sheets of Examples 1 to 15 exhibited a significant change in the color of the color-changeable layer due to ultraviolet exposure, and the change in color could be visually confirmed even under sunlight. From these results, it was shown that the skin-attaching sheets of these examples enable ultraviolet exposure to be recognized in real time.

Further, compared with Comparative Example 3, the skin-attaching sheets of Examples 1 to 15 exhibited superior close adhesion of the attaching portion to the skin and superior durability of the attachment to the skin. This is thought to be due to the fact that the attaching portion contained fibers and the fact that having an adhesive layer improved the close adhesion of the attaching portion to the skin and made it more difficult to peel off.

In addition, based on a comparison between Example 2 and Comparative Example 3, the inclusion of fibers in the attaching portion 1 was shown to be effective in increasing the color difference (ΔE*ab) between before and after ultraviolet exposure, making ultraviolet exposure more recognizable.

As shown in Table 3, the color change of the attaching portion in Example 5 under sunlight was suppressed as a result of the application of an ultraviolet protection cosmetic (liquid substance a and liquid substance b) on the attaching portion. From these results, it was shown that the use of the skin-attaching sheet of Example 5 enabled the ultraviolet protection performance (effectiveness) of the ultraviolet protection cosmetic applied on the skin to be recognized. Moreover, the ultraviolet protection performance of liquid substance a and liquid substance b could be compared based on the degree of color change of the color-changeable layer.

INDUSTRIAL APPLICABILITY

The skin-attaching sheet, method of using the same, ultraviolet detection method, and method for evaluating ultraviolet protection performance of the present invention enable exposure of the skin to ultraviolet rays to be recognized in real time.

The invention claimed is:

1. A skin-attaching sheet comprising an attaching portion configured for attaching to skin,
    wherein the attaching portion comprises a color-changeable layer that changes color following exposure to ultraviolet rays, and
    wherein the attaching portion has a color difference (ΔE*ab) in an L*a*b* color system between before the exposure to ultraviolet rays and 10 seconds after the exposure to ultraviolet rays of 5 or more and 300 or less in a standard exposure test in which the attaching portion is exposed to ultraviolet rays under the following conditions in a moist state:
    moist condition: 5 mg/cm of water is applied on the attaching portion, and the attaching portion is left to stand for 5 minutes to moisten;
    wavelength range: 280 nm to 400 nm;
    exposure time: 10 seconds; and
    ultraviolet intensity: 1.2 mW/cm²;
    wherein the color-changeable layer contains a photochromic compound, and wherein the photochromic compound is one or more selected from a spiropyran compound, a spirooxazine compound, a bipyridine compound, a fulgide compound, a chromene compound, and derivatives thereof.

2. The skin-attaching sheet according to claim 1, wherein the attaching portion is a fiber sheet.

3. The skin-attaching sheet according to claim 1, wherein the attaching portion comprises fibers having a fiber diameter of 10 nm or more and 3,000 nm or less.

4. The skin-attaching sheet according to claim 1, wherein the attaching portion comprises fibers, and the fibers contain a water-insoluble polymer.

5. The skin-attaching sheet according to claim 1, wherein the color-changeable layer contains a fiber, and the fiber contains a photochromic compound.

6. The skin-attaching sheet according to claim 5, wherein the photochromic compound is coated with the fiber.

7. The skin-attaching sheet according to claim 6, wherein the photochromic compound is embedded inside the fiber.

8. The skin-attaching sheet according to claim 1, wherein a content of the photochromic compound in the color-changeable layer is 0.1% by mass or more and 50% by mass or less.

9. The skin-attaching sheet according to claim 1, wherein the attaching portion has an average thickness of 0.1 µm or more and 500 µm or less.

10. The skin-attaching sheet according to claim 1, wherein the attaching portion has a visible light transmittance of 1% or more and 80% or 2 less in a state before the exposure to ultraviolet rays and in which the 5 mg/cm$^2$ of water has been applied to moisten the attaching portion.

11. The skin-attaching sheet according to claim 1, comprising a base layer arranged on one surface side of the attaching portion.

12. The skin-attaching sheet according to claim 11, wherein the attaching portion is peelable off of the base layer.

13. The skin-attaching sheet according to claim 1, comprising an adhesive layer laminated on the attaching portion and including an adhesive.

14. The skin-attaching sheet according to claim 1, wherein the attaching portion is closely adhered to the skin when attaching the attaching portion to the skin via a liquid substance comprising water or oil that is a liquid at 25° C., or attaching the attaching portion to the skin via a liquid substance comprising a polyol that is a liquid at 25° C.

15. The skin-attaching sheet according to claim 14, wherein the attaching portion is to retain the liquid substance in the attaching portion.

* * * * *